US006311196B1

United States Patent
Arora et al.

(10) Patent No.: US 6,311,196 B1
(45) Date of Patent: *Oct. 30, 2001

(54) METHOD AND APPARATUS FOR IMPLEMENTING WEB PAGES HAVING MASTER BORDERS

(75) Inventors: Samir Arora, San Jose; Martin Frid-Nielsen, Santa Cruz; Gagan Arora, Santa Clara; Bernard Desarnauts, Menlo Park, all of CA (US)

(73) Assignee: RAE Technology Inc., Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/827,642

(22) Filed: Apr. 9, 1997

(51) Int. Cl.[7] .............................. G06F 17/30; G06F 3/14
(52) U.S. Cl. ......................... 707/513; 707/526; 345/334
(58) Field of Search ...................................... 345/326, 333, 345/334, 335, 339, 340, 342, 343, 346, 352, 354, 356; 707/500, 501, 513, 517; 395/200.48; 709/217–219

(56) References Cited

U.S. PATENT DOCUMENTS 5,388,202 * 2/1995 Squires et al. ....................... 345/334
5,721,852 * 2/1998 Porter ................................ 345/334 X

OTHER PUBLICATIONS

Busch, "The perfect publisher", Computer Shopper, v16 n10, p550(7)., Oct. 1996.*
Engst, "Picture–perfect page builders", MacUser, v13 n1, p86(8), Jan. 1997.*
Snell, "Claris Home Page", MacUser, v12 n12, p36(1), Dec. 1996.*
Levine, "No sweat, if you code", Windows Sources, v4 n12, p60(2), Dec. 1996.*
"WebForms 2.7a now supports Microsoft Internet Explorer 4.0!!", http://www.q–d.com/wf.htm, 1997.*
"Spider Writer HTML Editor", http://www.spiderwriter.com/index.html.*
"Spider Writer HTML Editor—Frame Wizard", http://www.spiderwriter.com/framewiz.html.*
"Special Edition Using Microsoft FrontPage 97—Chapter 25", http://tw.uum.edu.my/suki/buku/Quebooks/frontpg/fp_25.htm, 1996.*

(List continued on next page.)

Primary Examiner—Joseph H. Feild
(74) Attorney, Agent, or Firm—McCutchen, Doyle, Brown & Enersen

(57) ABSTRACT

A method and apparatus that a user to specify "master borders" that are normally a part of each web page on a web site. A preferred embodiment of the present invention allows the user to define the size of top, left, right, and bottom margins for each master border. The master borders are used for each page on the web site, unless the user chooses not to use the default master border on a particular page. Each master border has display elements defined therein. Initially, all pages in a site have the same master border. The master border for each page may be changed by the user. Changes to a master border, such as the addition of display elements to a master border on one page, are reflected in all pages using the master border. The user can also, for each page, specify whether one or more margins of the master borders is implemented as an HTML frame. The editor generates an HTML table representing each web page (or each frame of the web page). The user can chose to have HTML for the master borders generated as frames, overlapped in a user-defined manner.

28 Claims, 27 Drawing Sheets

OTHER PUBLICATIONS

"FP98: Interpoerability with earlier version of FrontPage", http://it.db.dk/videnom/Software/WebDesign/FrontPage/Q173420.htm, May 1998.*

Flanagan et al, "Microsoft FrontPage verses Netscape Gold", http://www.1960pcug.org/pc_news/1997/february/microsof.htm, Feb. 1997.*

"Claris Home Page Tutorial: Adding frames to your Web page", http://twist.lib.uiowa.edu/homepage/tutorial/frames.html™17007, May 1997.*

Clyman, "Web page improvement: home-page editors for all sorts of users", PC Magazine, v15 n20, p39(5), Nov. 1996.*

"About Laura Lemay's Web Workshop: FrontPage 97", http://www.fpworkshop.com/books/about-fp97.htm, Oct. 1997.*

Tyler, "Laura Lemay's Web Workshop: FrontPage 97", pp. 313-339, 403-410, Jan. 1997.*

Oliver et al, "Netscape 2 Unleashed", pp. 391-420, 1996.*

Cascading Style Sheets, level 1, (W3C Recommendation Dec. 17, 1996)<http://www.w3.org/TRI-REC-CSS1-961217), 69 pages.*

* cited by examiner

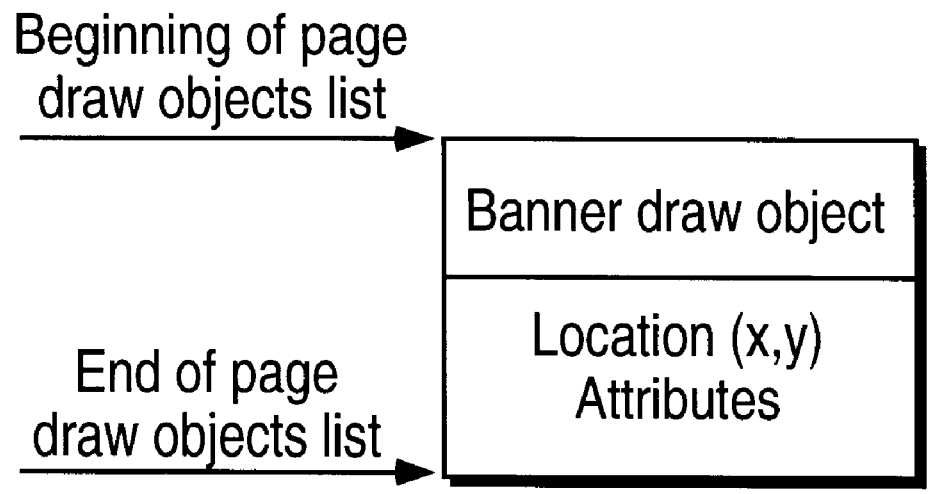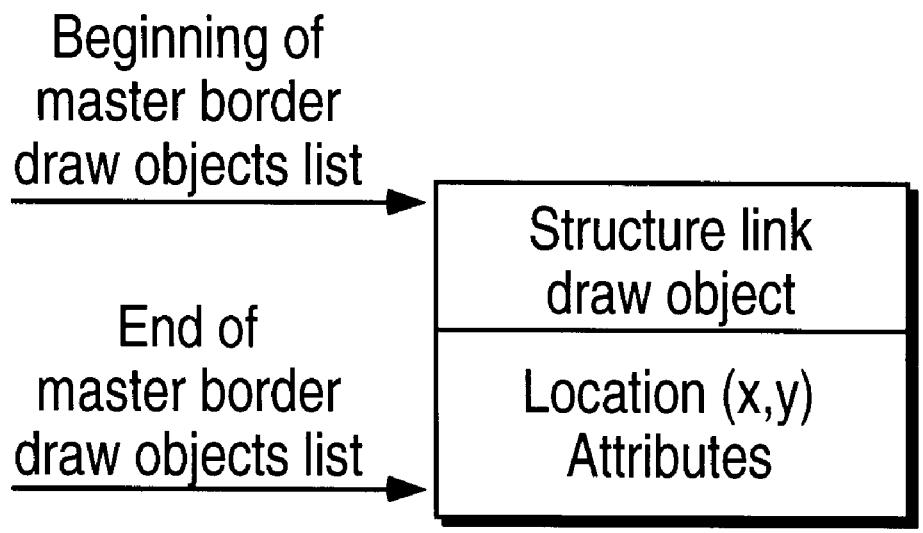
FIG. 4(a)

Master Border Definition Data Structures

Data Structure for a Page

Frame Order Within a Master Border
(Specified on a Per-page Basis)

Move/Add Element

Example of Size Check for Master Borders

Reordering Frames

Displaying Frames Based on Frame Order

Create Initial HTML

Build HTML Subtable

Generation of HTML for an HTML
Subtable in Accordance with Matrix

```
<P> <A HREF = netobjects homepge URL>
    <IMG SRC=link image\BORDER=O>
    </A>
</P>
</BODY>
</HTML>                           2102
```

FIG. 21
Generate Final HTML

| Object# | Start | Start + Length | | Object# | Start | Start + Height |
|---|---|---|---|---|---|---|
| 1 | 10 | 100 | | 1 | 80 | 95 |
| 2 | 30 | 40 | | 2 | 20 | 25 |
| 3 | 60 | 75 | | 3 | 10 | 70 |
| 4 | 30 | 40 | | 4 | 65 | 70 |
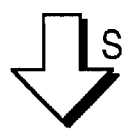 Sort and remove duplicates     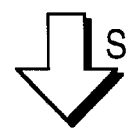 Sort and remove duplicates
Column Edges
10
30
40  ⎫
60  ⎬ 6 column edges
75  
100 ⎭
Row Edges
10
20
25
65  ⎫ 7 row edges
70
80
95
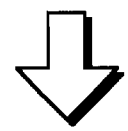 Determine width of each column     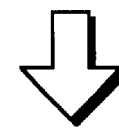 Determine height of each row
column widths 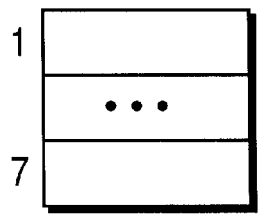     row heights 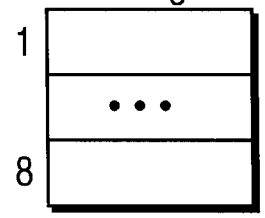
FIG. 23

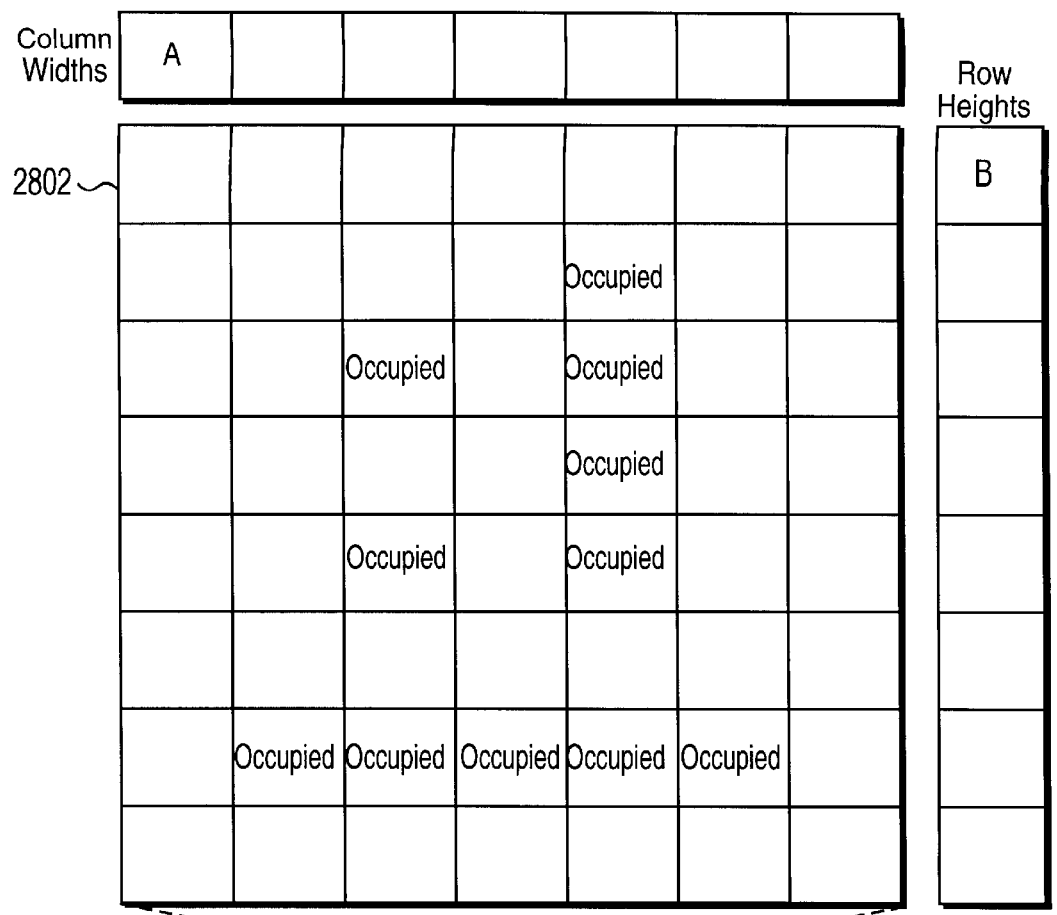
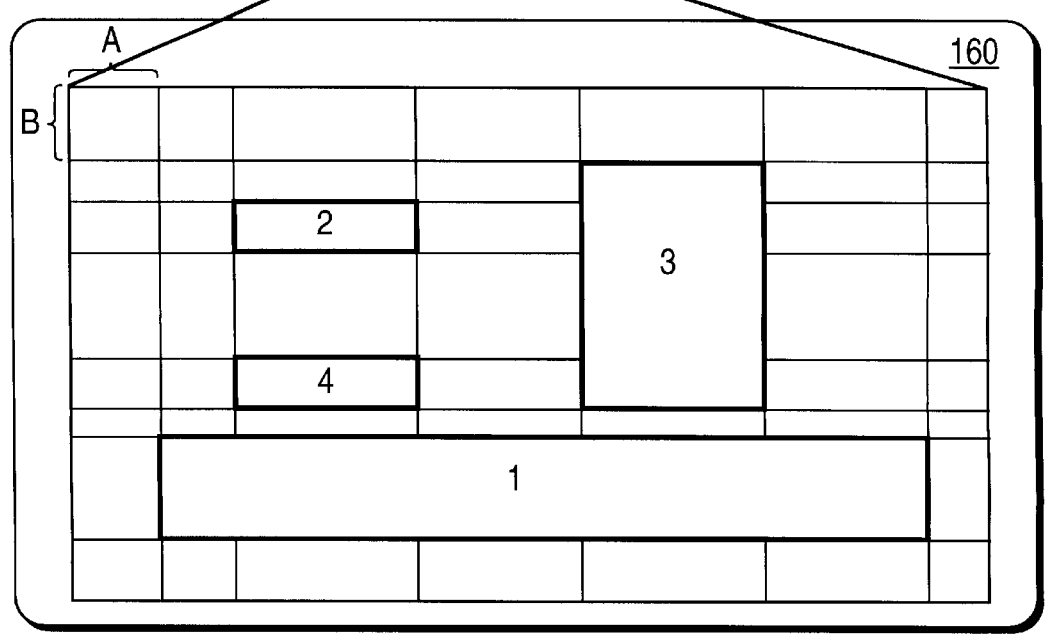
FIG. 25

METHOD AND APPARATUS FOR IMPLEMENTING WEB PAGES HAVING MASTER BORDERS

RELATED APPLICATIONS

Each of these related applications are herein incorporated by reference.

1) U.S. application Ser. No. 08/687,974 of Arora et al., entitled "Draw Based Editor for Web Pages," filed Jul. 29, 1996, U.S. Pat. No. 5,845,299, issued Dec. 1, 1998, and 2) U.S. application Ser. No. 08/687,971 of Arora et al., entitled "Hierarchical Structure Editor for Web Sites," filed Jul. 29, 1996, U.S. Pat. No. 5,911,145, issued Jun. 8, 1999 and 3) U.S. application Ser. No. 08/827,634 of Boye et al., entitled "Method and Apparatus For Implementing Web Pages Having Smart Tables," filed concurrently herewith.

FIELD OF THE INVENTION

This application relates to software for editing web pages and, specifically, to a method and apparatus that allows a user to specify borders for a web page.

BACKGROUND OF THE INVENTION

Recently, people have begun to automate the task of designing world wide web pages. Various software programs exist that allow people to define the appearance of a web page. Users on the world wide web can then view the defined page using browser software. In general, when viewed with a browser, the defined page will appear as it was defined. Conventional web page editors, however, do not allow the user complete freedom in where to place elements on the borders of all web pages on a web site. What is needed is an improved way to let the human designer plan his web site.

SUMMARY OF THE INVENTION

A preferred embodiment of the present invention overcomes the problems and disadvantages of the prior art by allowing the user to specify "master borders" that are normally a part of each web page on a web site. Web page editor software designed in accordance with the present invention generates the internal representation of a page (such as HTML) differently depending on how the user specifies the web page.

Specifically, a preferred embodiment of the present invention allows the user to define the size of top, left, right, and bottom margins for each master border. The master borders are used for each page on the web site, unless the user chooses not to use the default master border on a particular page. Each master border has display elements defined therein. Initially, all pages in a site have the same master border. The master border for each page may be changed by the user. Changes to a master border, such as the addition of display elements to a master border on one page, are reflected in all pages using the master border.

The user can also, for each page, specify whether one or more margins of the master borders is implemented as an HTML frame. Frames can have separate styles, etc.

The editor generates an HTML table representing each web page (or each frame of the web page). The user can chose to have HTML for the master borders generated as frames, overlapped in a user-defined manner.

In accordance with the purpose of the invention, as embodied and broadly described herein, the invention is a method for allowing a user to specify master borders for a web site, comprising the steps, performed by a data processing system, of: defining a master border for a web site; displaying a web page of the web site, where the first web page is automatically displayed having the master border; and displaying a second web page of the web site, where the second web page is automatically displayed having the master border.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 4(a) is a diagram showing exemplary draw objects stored in a memory in accordance with the display elements of FIG. 3.

FIG. 21 is an example of steps performed by the page editor to generate final HTML for a site.

FIG. 23 is an example of second steps involved in determining an HTML subtable size.

FIG. 25 is a block diagram of how the matrix of FIG. 24 is used to generate an HTML table.

DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

System Overview

Figure 1:
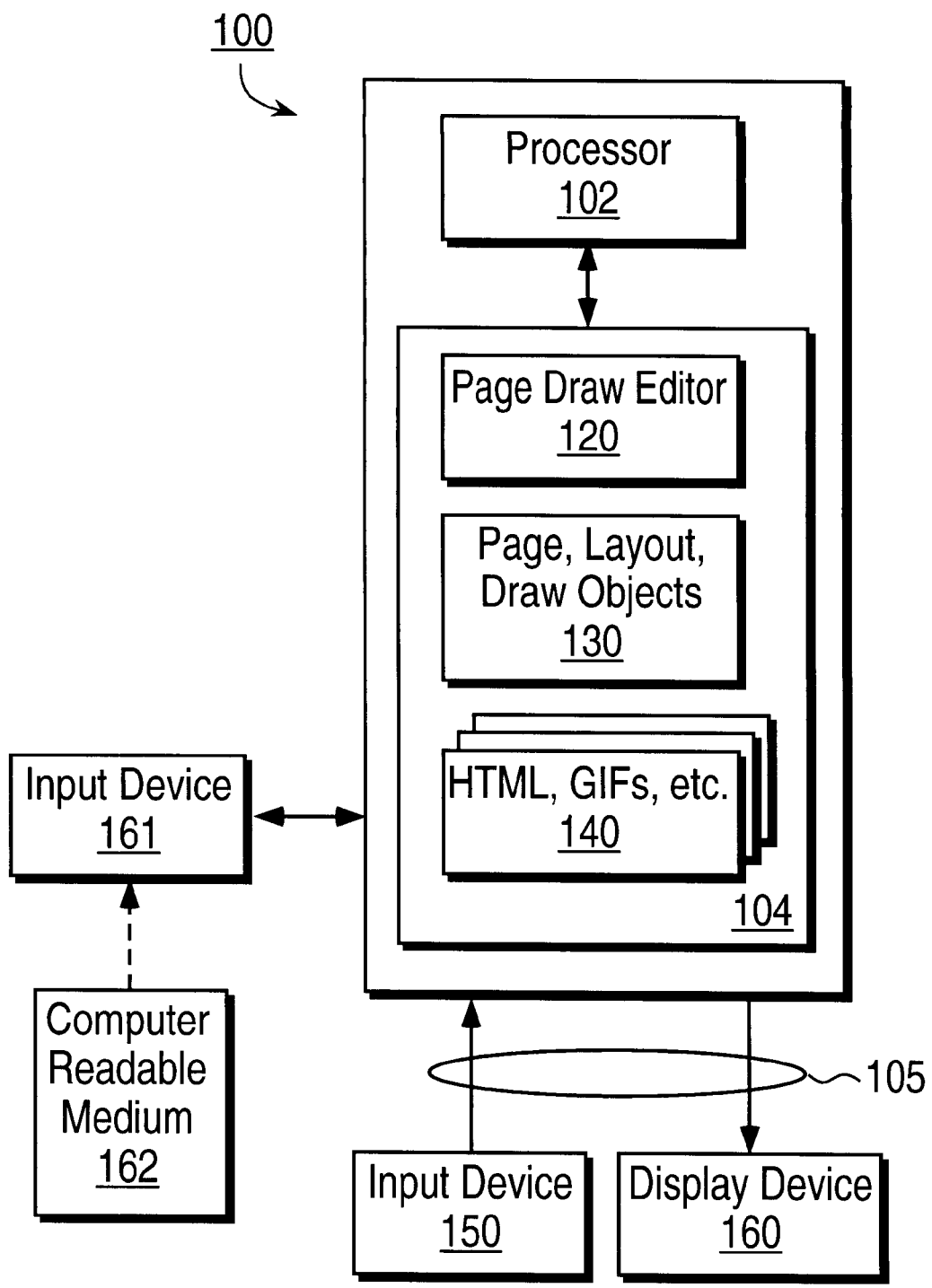
FIG. 1 is a block diagram of a computer system used in accordance with a preferred embodiment of the present invention.

FIG. 1 is a block diagram of a computer system 100 in accordance with a preferred embodiment of the present invention. Computer system 100 includes a CPU 102; a memory 104; input/output lines 105; an input device 150, such as a keyboard or mouse; and a display device 160, such as a display terminal. Computer 100 also includes an input device 161, such as a floppy disk drive or CD ROM reader, that reads computer instructions stored on computer readable medium 162, such as a floppy disk or a CD ROM. These computer instructions are the instructions of e.g., page draw editor software 120. Memory 104 includes page draw editor software 120 ("editor software"), draw objects 130, HTML 140, image files 140, etc., as described in further detail below.

A person of ordinary skill in the art will understand that memory 104 also contains additional information, such as application programs, operating systems, data, etc., which are not shown in the figure for the sake of clarity. It also will be understood that computer system 100 can also include numerous elements not shown in the Figure for the sake of clarity, such as disk drives, keyboards, display devices, network connections, additional memory, additional CPUs, LANs, internet connections, input/output lines, etc.

In the following discussion, it will be understood that the steps of methods and flow charts discussed preferably are performed by processor 102 executing instructions stored in memory, such as instructions of editor software 120. Editor software 120 can be initially loaded into memory from computer readable medium 162. It will also be understood that, although the following paragraphs describe an implementation of the present invention using object-oriented programming techniques, the invention is not limited to any such techniques and may be implemented using any appropriate techniques for implementing the functionality described herein. The described embodiment is written in the C++ programming language and runs under the Windows 95 operating system, but the invention is not limited to any particular programming language or operating system. ("Windows 95" is a trademark of Microsoft Corporation.)

Creation and Manipulation of a Web Page Layout

Figure 2:
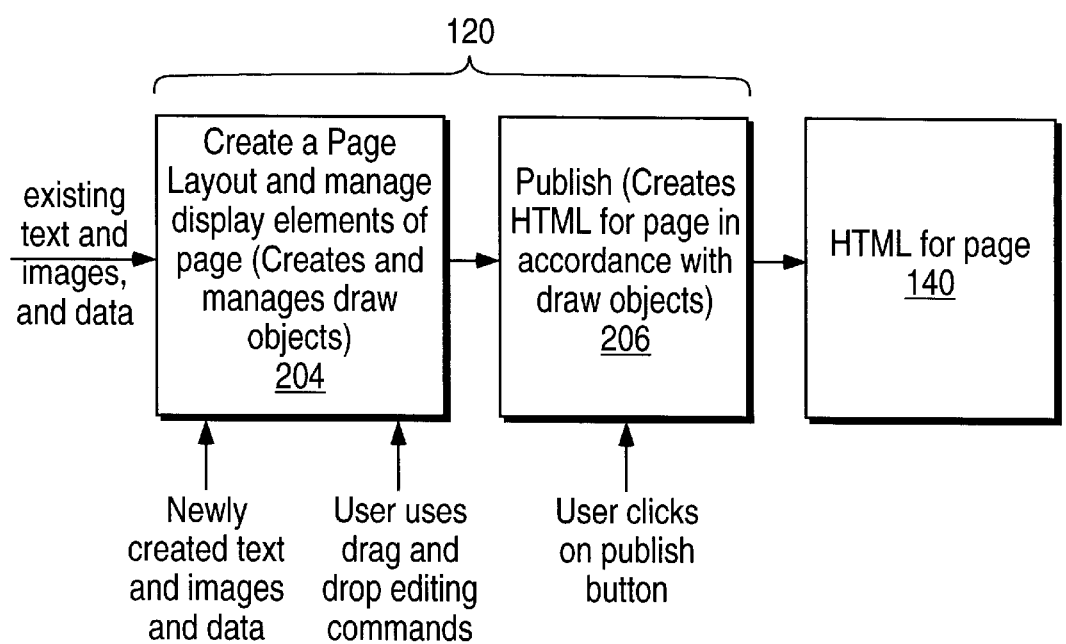
FIG. 2 is a block diagram showing input and output to and from page draw editor software of FIG. 1.

FIG. 2 is a block diagram showing input and output to page draw editor software 120 of FIG. 1. Page draw editor 120 includes a portion 204 that creates and manages a page layout and a portion 206 that publishes the page. The user uses a drag and drop interface to define the page layout. Pages can include new text and images or preexisting text and images. The user initiates publish portion 206 by clicking on a "publish" button displayed by the editor 120, as described below. Publish portion 206 generates an internal representation of a page (such as a representation in HTML) for the page, as also described below. The page preferably is translated into HTML that yields a WYSIWYG Web page when displayed by a browser.

Creating and Modifying Display Elements of a Page Layout

Figure 3:
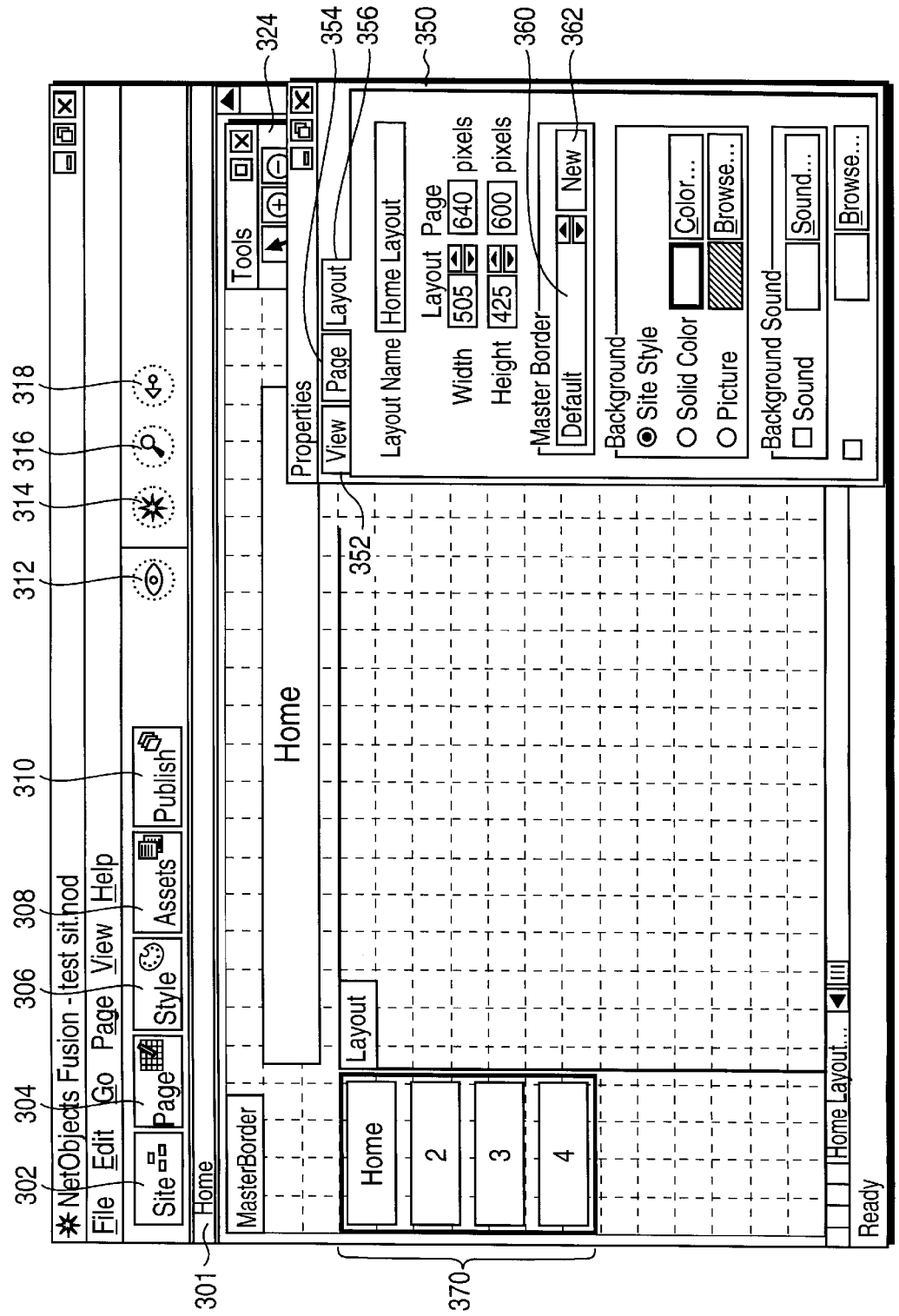
FIG. 3 shows an example of display view before the user has created any display elements on the page.

FIG. 3 shows an example of a page view displayed on display device 160 before the user has created any display elements on the page. The display of FIG. 3 is opened when the user indicates (using a pull-down menu or the like) that he wishes to view the layout of a page in the site. In the described embodiment, the user clicks on a "Page" button 304 in the navigator bar. In the example, the user has chosen to view a "Home" page in his site. The site has previously been defined by the user as having the Home page and three "children" pages (named "2," "3," and "4") for the Home page.

The page draw editor allows the user to design a page just as it will appear when viewed with a browser. The user uses the page draw editor to add text graphics, and other display elements to the page. The user can then rearrange display elements by dragging and dropping them to a new location, placing the display elements exactly where they will eventually appear with pixel level accuracy.

A title 301 of the page defaults to the name of the page (e.g., "Home"). FIG. 3 includes a grid of lines. These lines are shown as dotted lines, but can also be solid lines. In the described embodiment, the grid also can be turned off so that no grid is displayed. The grid preferably is not included in the generated internal representation. In FIG. 3, the grid has a default granularity of 24×24 pixels.

The display of FIG. 3 includes a plurality of buttons: a "Site" button 302, "Page" button 304, a "Style" button 306, an "Assets" button 308, and a "Publish" button 310. The display also includes a "Preview" button 312, a "New Page" button 314, a "Goto" button 316, and a "Last" button 318. Site button 302 causes execution of a "site editor" as described in U.S. Pat. No. 5,911,145 of Arora et al. Style button 306 and Assets button 308 are discussed in U.S. Pat. No. 5,845,299 of Arora et al. New Page button 314 causes a page such as the page of FIG. 3 to be displayed.

Goto and Last buttons 316, 318 transfer control to a most recent display or a user-selected previous display, in a manner known to persons of ordinary skill in the art. The described embodiment keeps a "history" of execution of page draw editor 120 in order to implement the Goto and Last buttons.

FIG. 3 also shows "Properties" window 350 in which a "Layout" tab is selected. Properties window 350 includes three tabs: a "View" tab 352, a "Page" tab 354, and a "Layout" tab 356. The values shown in Properties window 350 are values for the current page. Properties window 350 currently shows layout properties because Layout tab 356 is selected and the cursor is in the "layout" section of the page.

A fourth tab (not shown) is a context sensitive tab and represents various properties, depending on the drawing tool being used and/or the position of the cursor. Other tabs may appear in other implementations. It will be understood by persons of ordinary skill in the art that page draw editor software 120 stores values corresponding to this Properties window and each Property window discussed herein in memory 104. All values in Properties window 350 may be changed by the user. Values in memory 104 will be changed accordingly. It will be understood that the user interface shown in FIG. 3 (and throughout this document) is provided for the sake of example and that any appropriate user interface can be used to implement the present invention.

The display of FIG. 3 further includes a "Tools" window 324 as discussed in U.S. Pat. No. 5,845,299 of Arora et al. It will be understood that an empty page can be edited in the same manner as an existing page.

FIG. 3 shows a banner and navigator buttons automatically created by a preferred embodiment of the present invention. The example of FIG. 3 is displayed after the user indicates that he wants to edit an existing page by preferably: 1) double clicking on an icon for the page in a "site view" (not shown) or 2) selecting a page icon and clicking "Page" button 304 (not shown). The described embodiment of the present invention automatically creates certain draw objects in memory for the page. The automatically created draw objects reflect links between pages of the site, as described in U.S. Pat. No. 5,911,145 of Arora et al. The user can easily create and move display elements on the page, which causes changes to corresponding draw objects in memory 104.

In FIG. 3, the navigator buttons are automatically created. These buttons are "structure link" buttons. Thus, while they appear on each page having the default master border, the actual buttons will differ, depending on the location of the page in the site hierarchy. Each master border contains a "structure link" draw object that causes the buttons to be displayed and generated.

Properties window 350 also includes a master border area, including a name 360 of a master border to user for the page (e.g., "Default"). The master border name chosen in area 360 indicates an initial, predetermined size for the left, top, right, and bottom margins of the page. These margins can be changed by the user. Initially, all pages use a default master border, although the master border used for an individual page can be changed explicitly by way of changing the name in area 360 when the page is displayed. If the user wants to define a new master border, the user presses button 362 and a new master border name is created and added to the list of area 360, while a corresponding new master border definition is stored in memory (see FIG. 4(b)). If the user changes attributes (such as margin size) of a master border anywhere in a site, the change will occur on all pages using the set of master borders.

Creation of Draw Objects for the Display Elements

FIG. 4(a) is a diagram showing exemplary draw objects stored in memory 104 in accordance with the display elements of FIG. 3. In the described embodiment, each display element has a corresponding draw object. The draw objects for each page are stored in a list and the draw objects for each master border are stored in a list. When the user alters the position of a display element on the screen, the values stored in the corresponding draw object are also altered. The position of the draw object in the list does not change, however. FIG. 4(a) shows two draw objects, corresponding to the banner and four buttons of FIG. 3. There are other elements in the display elements list (such as border elements) that are not shown for the sake of ease of explanation.

It will be understood that all draw objects discussed in the following paragraphs include a screen position field (indicating the X and Y coordinates of the objects' current position on the screen), the height and width of each draw object on the screen, and various flags associated with display of the object. Flags include whether the object has a frame drawn around it, whether the object may be resized to zero width or height, whether the object itself handles mouse commands internally, whether the object is currently selected, the color of the object, whether the object is transparent, whether the object contains text, etc. It will be understood that the specific flags stored in an object may vary from implementation to implementation. The position, height, width and flag values are not shown for the sake of clarity. It will also be understood that each type of draw object contains the data required to describe the appearance and function of the corresponding display element.

Draw objects can be of a variety of types or classes. It will be understood that the present invention does not necessarily include any specific types of draw objects and may include more or fewer types of draw objects than are discussed herein. The draw objects in a preferred embodiment include, without limitation:

rectangle,
    round rectangle,
    line,
    ellipse,
    text,
    picture/image,
    polygon,
    OLEobject,
    JavaScript,
    database list,
    database field,
    form button,
    form radio button,
    form checkbox,
    form edit,
    form combobox,
    form clear button,
    zoomin,
    zoomout,
    grid,
    graphic,
    hotspot rectangle,
    hotspot polygon,
    hotspot ellipse,
    background picker,
    Shockwave object,
    Sound,
    Video,
    ActiveX,
    Form Multi edit, and
    MAX SHAPE In the described embodiment, each type of draw object has associated information that, in general, allows the draw object to be displayed on display device 150 in accordance with user draw commands. This information is also used to generate HTML for the object (including links and anchors).

Figure 4B:
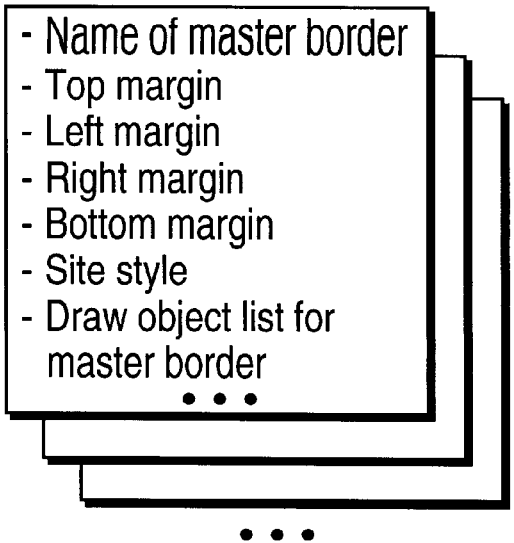
FIG. 4(b) shows a data structure defining a master border.

FIG. 4(b) shows a data structure in memory 104 defining a master border. It includes, but is not limited to, a name of the master border, sizes for the top, bottom, right, and left margins of the master border, a site style for the master border, and a pointer to a draw object list for the master border.

Figure 4C:
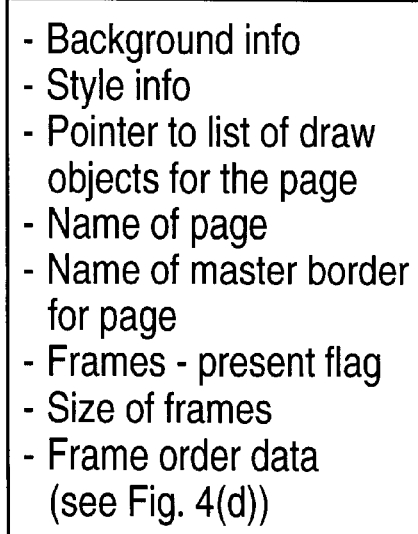
FIG. 4(c) shows a data structure defining a page.

FIG. 4(c) shows a data structure in memory 104 defining a page. It includes, but is not limited to, background information for the page (e.g., color, pattern, etc.), style information for the page, a pointer to a list of draw objects for the page, a page name, a name of a master border used for the page, a "frames$_{13}$ present" flag, indicating whether the page contains any frames in its master border, the size of the frames, and frame order data as described in FIG. 4(d).

Figure 4D:
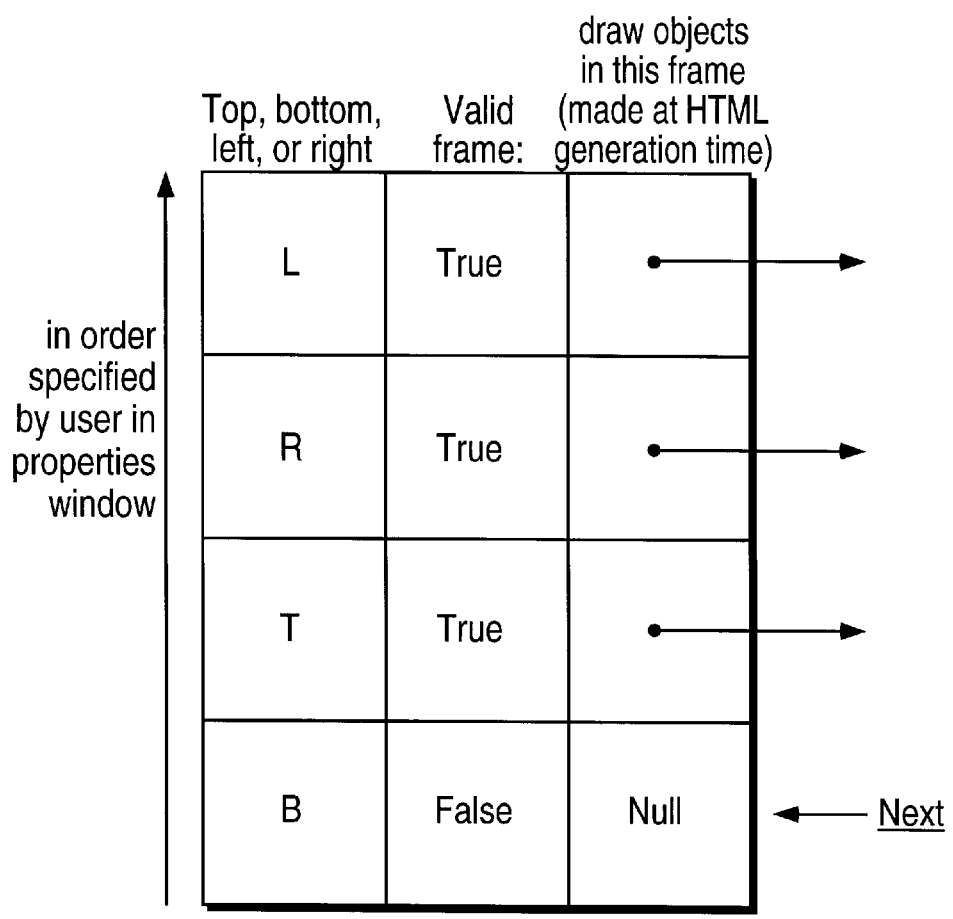
FIG. 4(d) shows a data structure defining a frame order within a master border.

FIG. 4(d) shows a data structure in memory 104 defining a frame order within a master border. In the Figure, the frame order shown is the frame order specified in FIG. 9. Thus, the frame order is: left, right, and top, while the bottom margin is not a frame. A valid flag indicates whether the user has indicated that the margin should be implemented as a frame. Each valid frame has a pointer to a list of draw objects for the frame, although this list is not created until the time of HTML generation. As discussed above, each page can have one or margins of its master border implemented as a frame, independently of the other pages in the site.

Figure 5:
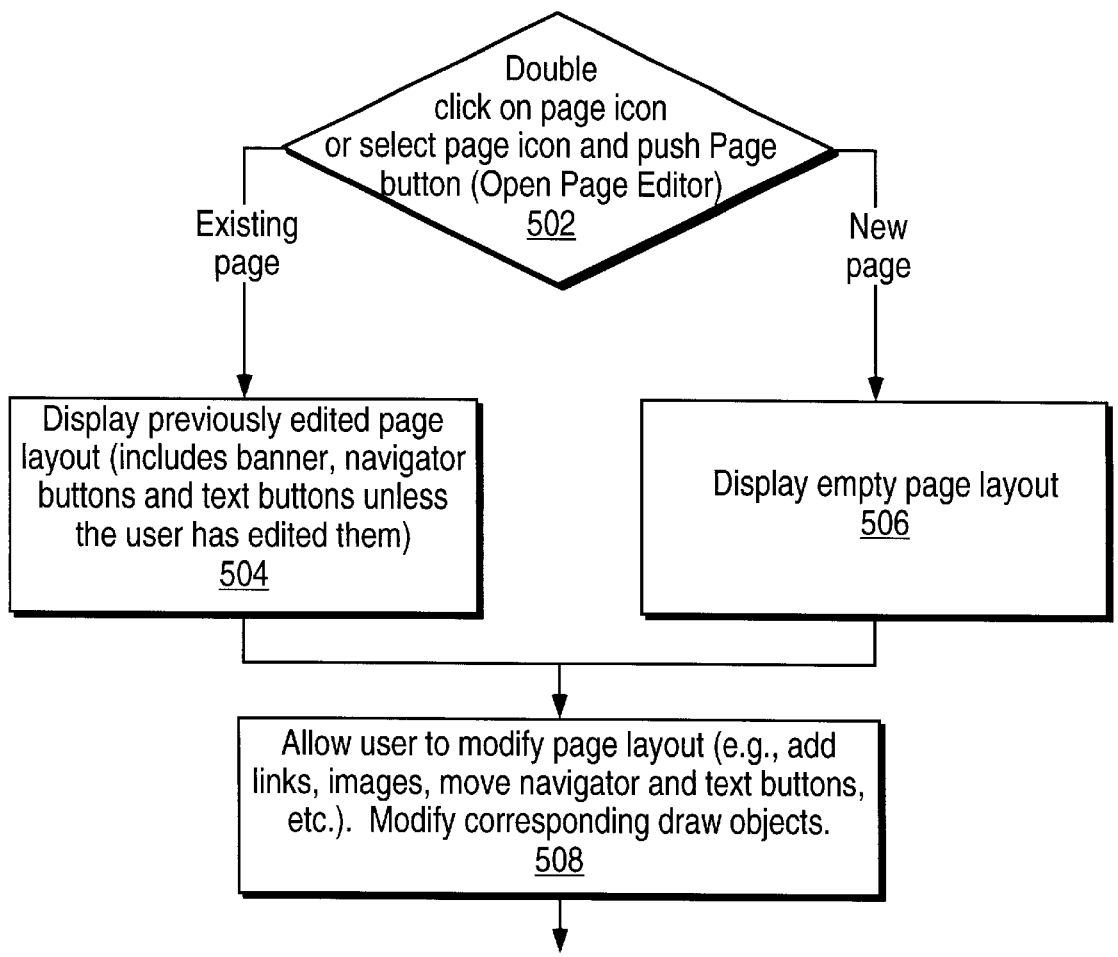
FIG. 5 is a flow chart showing steps performed by the page draw editor software to define a page layout.

FIG. 5 is a flow chart showing steps performed by page draw editor software 120 to edit a page layout during execution of the page draw editor. In step 502, the page draw editor determines whether the page is a new page. If it is an existing page, in step 504, the current page layout for the page is displayed in accordance with the already existing draw objects stored in memory for the page. The page layout automatically includes the automatically generated banner and navigator buttons, unless the user has previously deleted them. A master border for a page is displayed in accordance with the information in the data structure of FIGS. 4(a)–4(d).

If the page is a new page, in step 506, the editor displays the default page layout and master border for a new page. The user exits the page draw editor by, e.g., clicking on Site button 302, Style button 306, Assets button 308, or Publish button 310 (or by selecting "exit" from a pull-down menu). After the user has edited a page, he can still move the page around in the site hierarchy by using the structure/site editor, as described in the co-pending application of Arora et al.

As shown in step 508, the user can add display elements to the page and can move existing display elements via a "drag and drop" interface, or any other appropriate interface. As discussed below, each time the user moves an element on the display, a corresponding draw object in memory 104 is modified in accordance with the user's action.

Master Borders

In the described embodiment of the present invention, each new page is defined to have a predetermined default master border. The user can change the master border of each page by changing the name of the master border in area 360 of layout tab 350. Additional details of how master borders are created and changed in the described embodiment are discussed below in connection with FIGS. 6–15.

Figure 6:
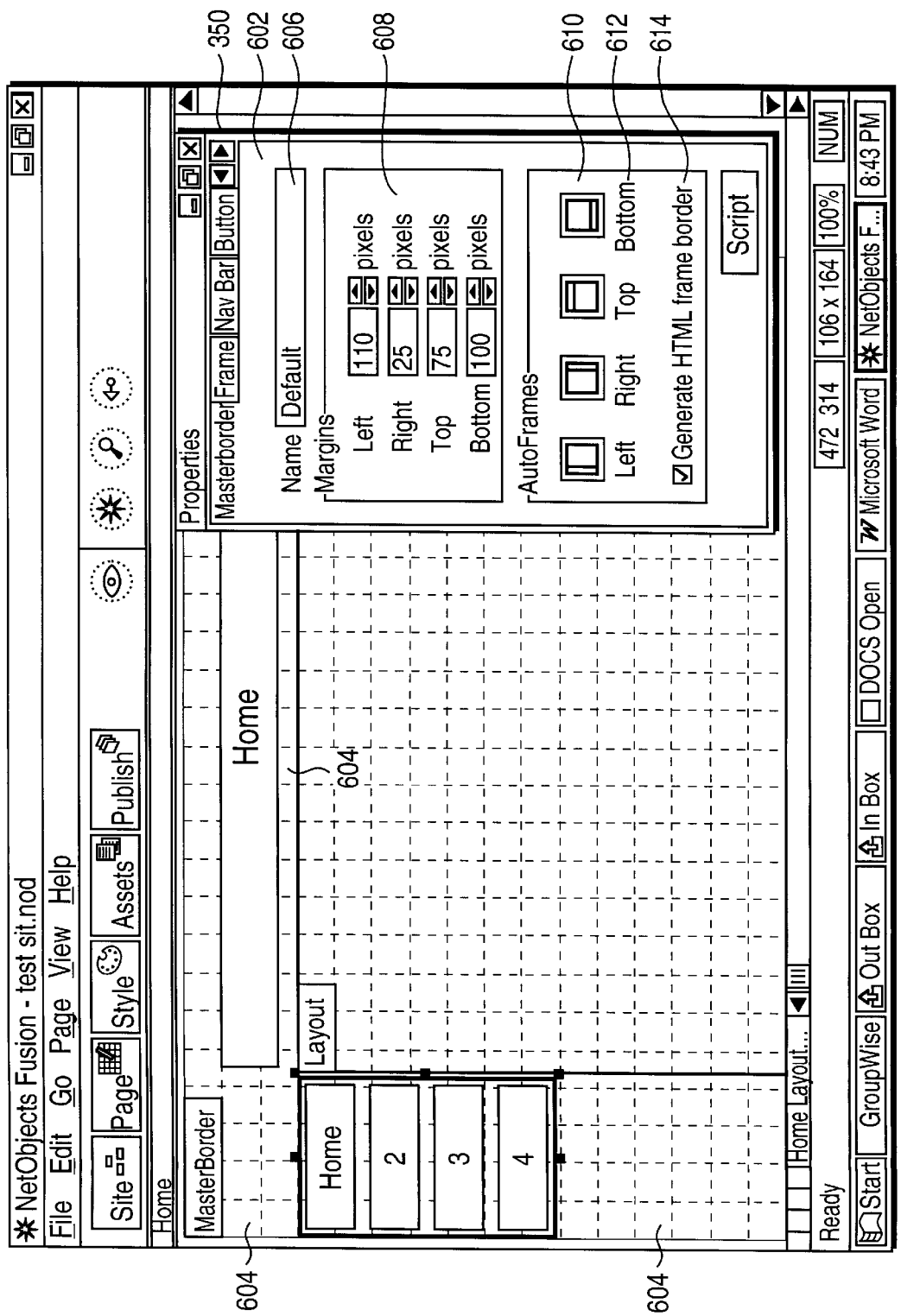
FIG. 6 shows the page of FIG. 3 with an open Properties window and a MasterBorder tab.

FIG. 6 shows the page of FIG. 3 with an open Properties window and a MasterBorder tab 602. MasterBorder tab 602 is displayed when the user moves the cursor over a master border area on the display and selects the area (e.g., by clicking a mouse button). Although not shown in the Figure, the MasterBorder area preferably extends completely around the perimeter of the page (i.e., on the left, top, bottom, and right margins of the page). MasterBorder tab 602 is displayed in Properties window 350.

MasterBorder tab 602 includes the name 606 of the MasterBorder used on the page and various user-changeable attributes of the master border. The user can change the number of pixels in the left, right, top, and/or bottom margins of the master border via Margins area 608. The up and down arrows allow the user to increment or decrement, respectively, the number of pixels in the Margins. Any appropriate user interface can be used to allow the user to change the size of the margins. In the example, the left margin is 110 pixels wide, the right margin (not shown) is 25 pixels wide, the top margin is 75 pixels wide, and the bottom margin (not shown) is 100 pixels wide).

AutoFrames area 610 allows the user to specify an order for the left, right, top, and/or bottom margins of the master border if any part of the master border is implemented using "frames," as described in further detail below. Check box 614 allows the user to indicate whether any part of the master border should be implemented using "frames."

Figure 7:
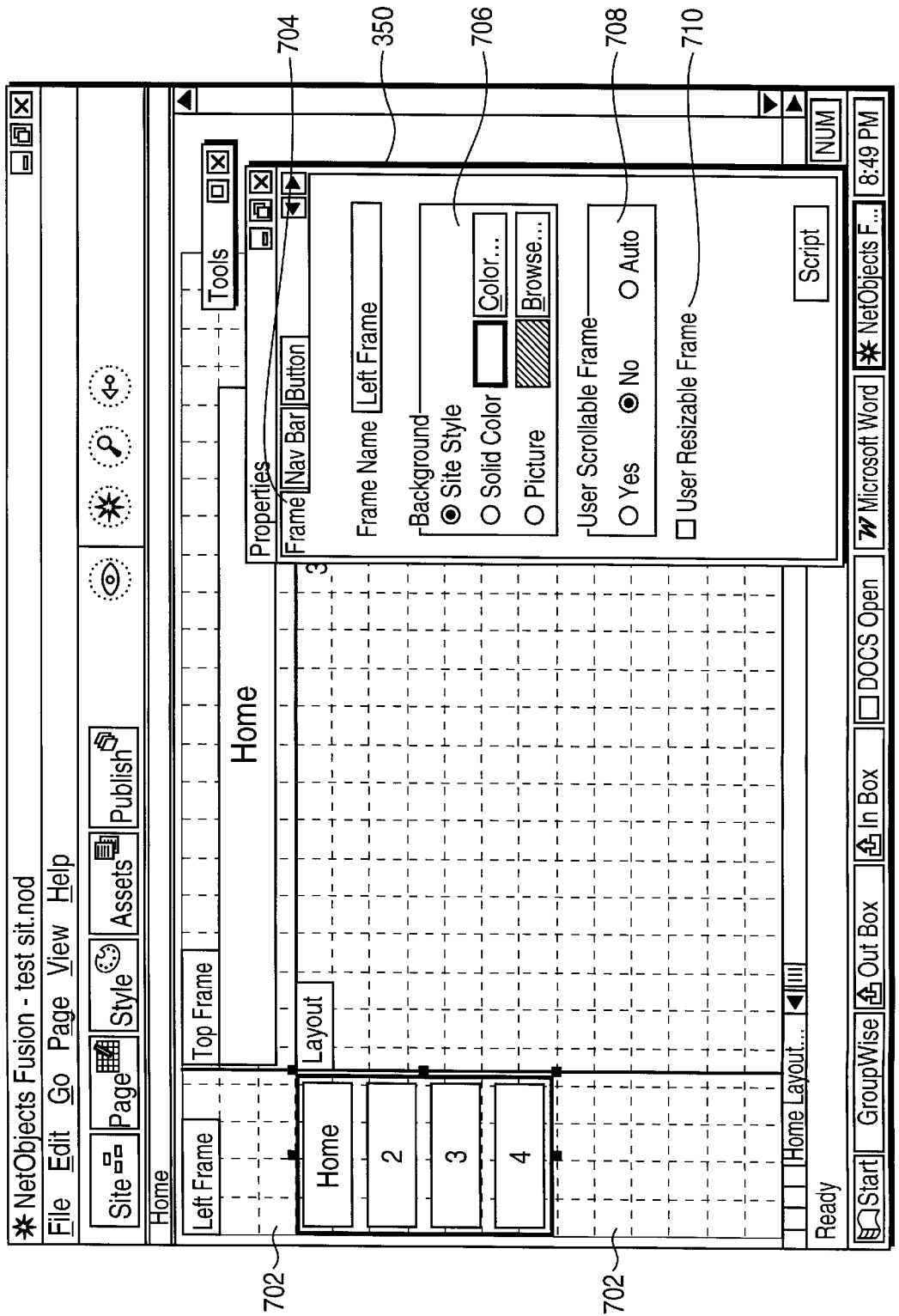
FIG. 7 shows the page of FIG. 3 with the open Properties window and a Frame tab.

FIG. 7 shows the page of FIG. 3 with the open Properties window and a Frame tab. In FIG. 7, the user has previously indicated that at least the left and top margins are to be implemented as frames. The user has also selected the left frame 702. When a frame is selected, Frame tab 704 appears in Properties window 350.

Frame tab 704 includes a name of the selected frame (e.g., left frame), a Background area 706, a User Scrollable Frame area 708, and a User Resizeable Frame checkbox 710. Background area 706 allows the user to change the background and style of the frame to be different from that of the rest of the page. User scrollable frame area 708 allows the user to indicate whether the frame should scroll when the page is displayed by a browser. User Resizeable Frame checkbox 710 allows the user to indicate whether the frame is user-resizeable when displayed by a browser. It will be understood that changing each area of FIG. 7 changes corresponding values in memory 104.

Figure 8:
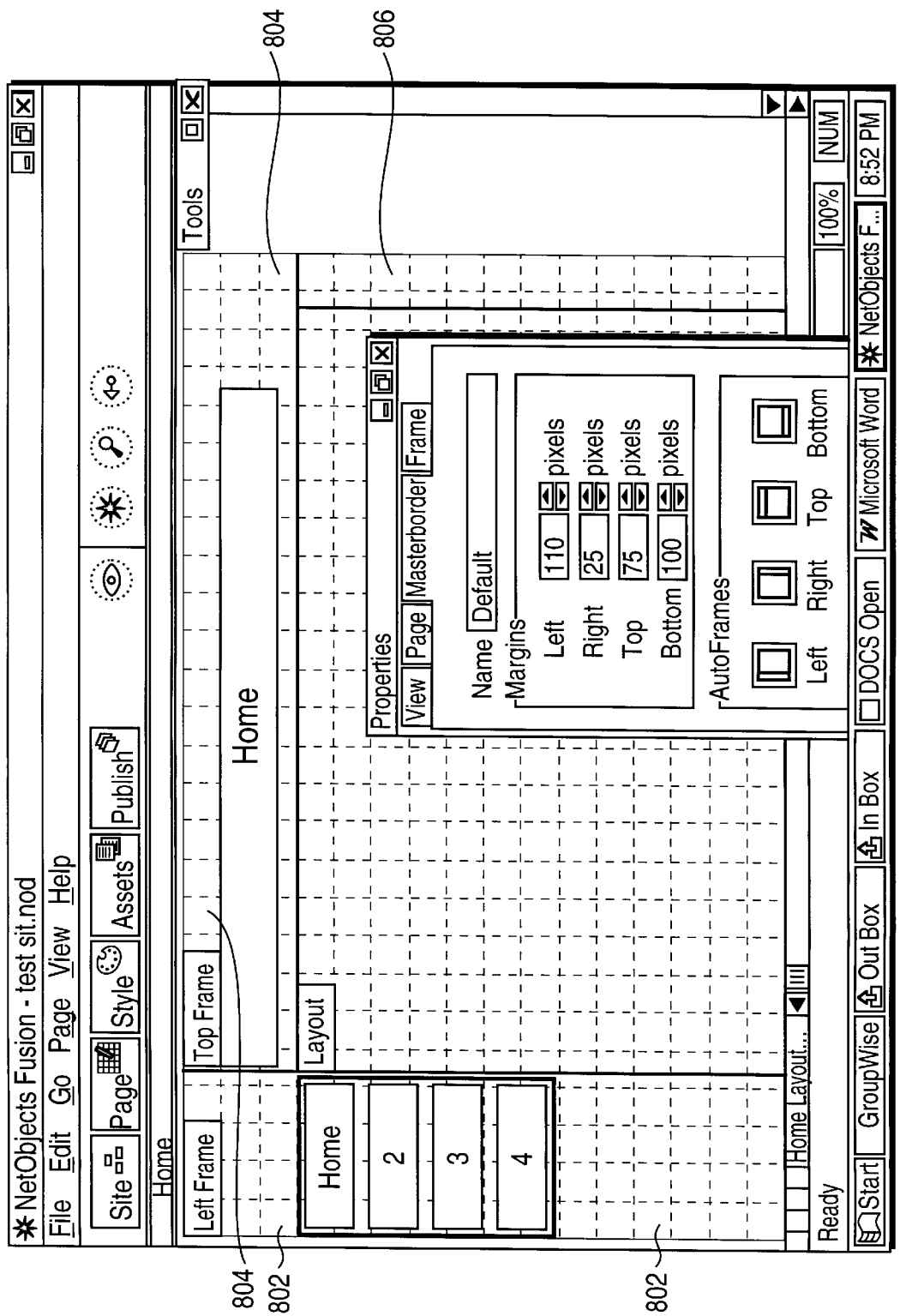
FIG. 8 shows the page of FIG. 3 where the user has selected Auto Frames in a first order.

FIG. 8 shows the page of FIG. 3 where the user has selected Auto Frames in a first order. The order selected by the user is indicated in parenthesis under each frame picture. In the Figure, the user has selected frames in the order: left, top, and right (the bottom margin is not selected) by clicking on the frame pictures in the given order. The user can deselect a frame by clicking on the corresponding frame picture and the order will be adjusted accordingly by taking the deselected frame out of the order. In the example, because the left frame 802 is selected first, it extends to the top of the page. The second ordered top frame 804 does not extend to the far left margin because of the fact that the left frame extends to the top. Similarly, the third ordered right frame 806 does not extend to the top of the page because of the fact that the top frame extends to the right.

Figure 9:
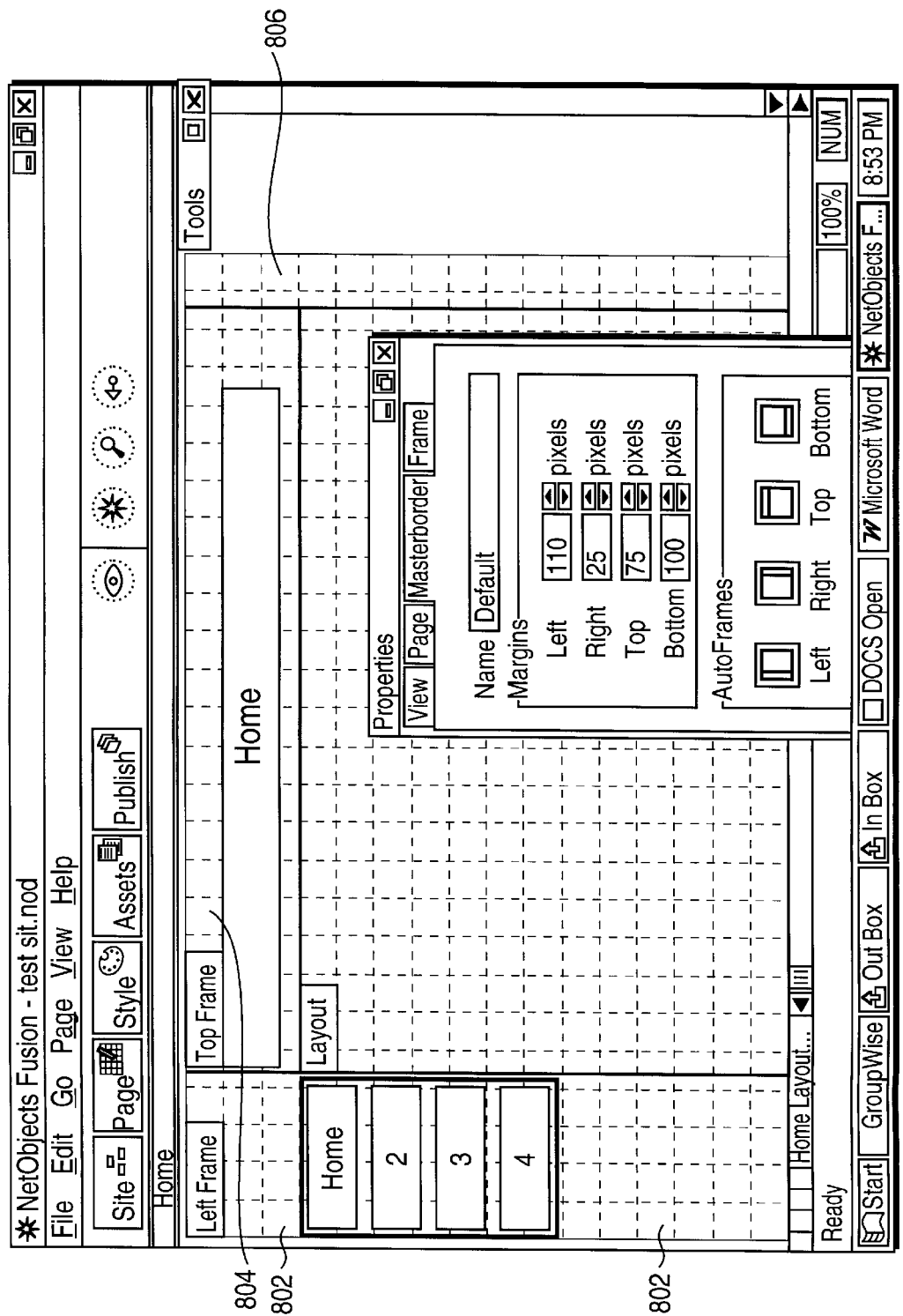
FIG. 9 shows the page of FIG. 3 where the user has selected Auto Frames in a second order.

In contrast to FIG. 8, FIG. 9 shows the page of FIG. 3 where the user has selected Auto Frames in a second order. In the Figure, the user has selected frames in the order: left, right, and top (the bottom margin is not selected) by clicking on the frame pictures in the given order. In the example, as in FIG. 7, because the left frame 802 is selected first, it extends to the top of the page. The second ordered right frame 806 also extends to the top of the page. The third selected top margin 804 does not extend to the far left or far right margins because of the fact that the left and right frames extend to the top.

Figure 10:
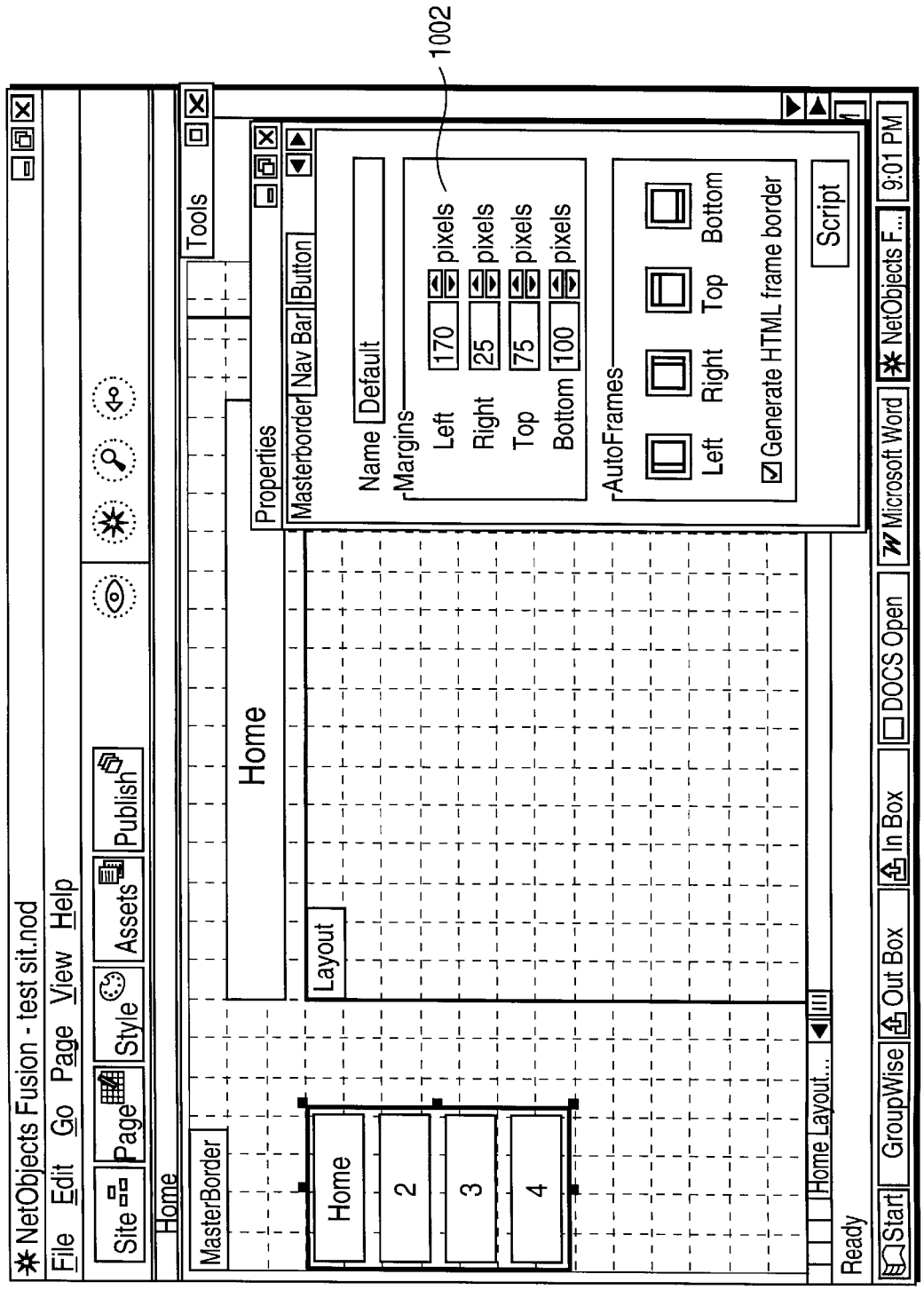
FIG. 10 shows the page of FIG. 3 where the user has increased the size of the left master border margin.

FIG. 10 shows the page of FIG. 3 where the user has increased the size of the left master border. In the example, the user has clicked on increment arrow 1002 to increase the number of pixels in the left margin from 110 to 170. The size of the left margin on the display is increased accordingly and a corresponding value in memory 104 is changed.

Figure 11:
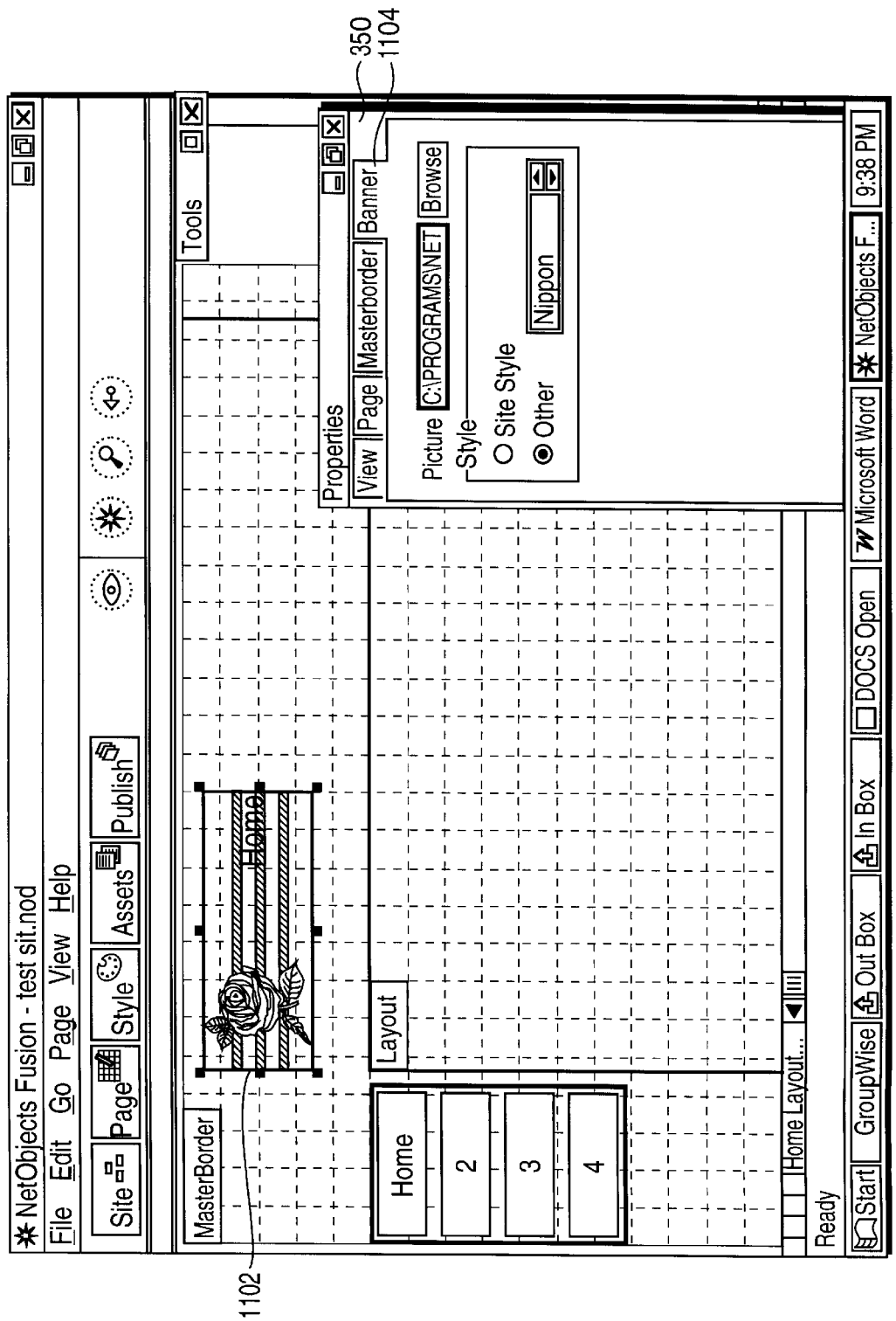
FIG. 11 shows the page of FIG. 3 where the user has selected a new page style having a different sized banner.

FIG. 11 shows the page of FIG. 3 where the user has selected a new page style having a different sized banner. In the example, the user has selected a style called "Nippon", which has a small size banner. This action causes all display elements on the page to be displayed using the selected style. The user has also selected the banner 1102. This causes editor 120 to display a banner tab 1104.

Figure 12:
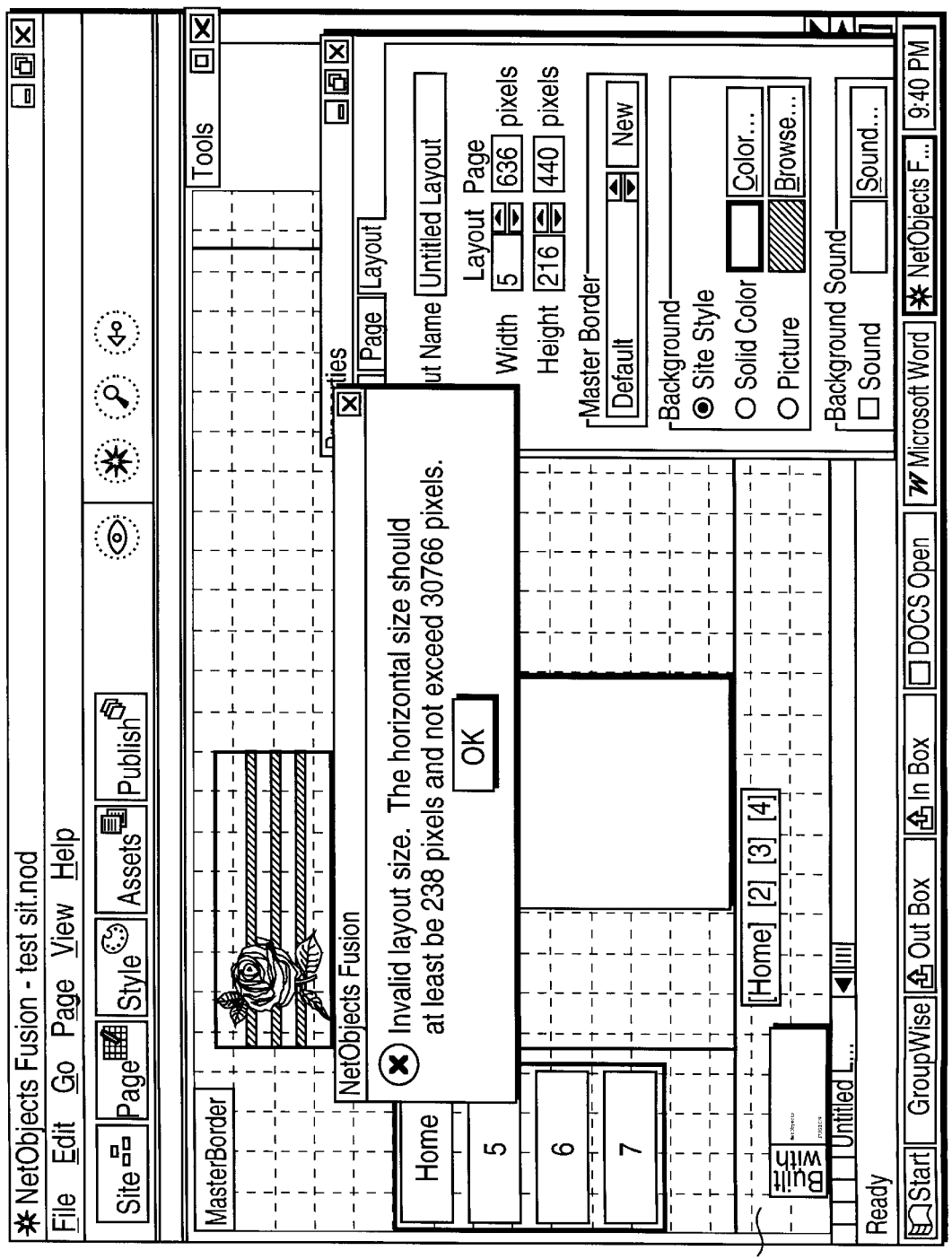
FIG. 12 shows the page of FIG. 11 where the user has tried to decrease the size of the left master border margin to be smaller than the display elements therein.

FIG. 12 shows the page of FIG. 11 where the user has tried to decrease the size of the layout area to be smaller than the display elements therein. In the described embodiment, the user can change the size of the left, right, top and bottom margins, but only so far as allowed by the size of the display elements therein. The user cannot change the size to be smaller than the display elements or larger than the size of the page. FIG. 12 also shows an example of a bottom margin 1204.

Figure 13:
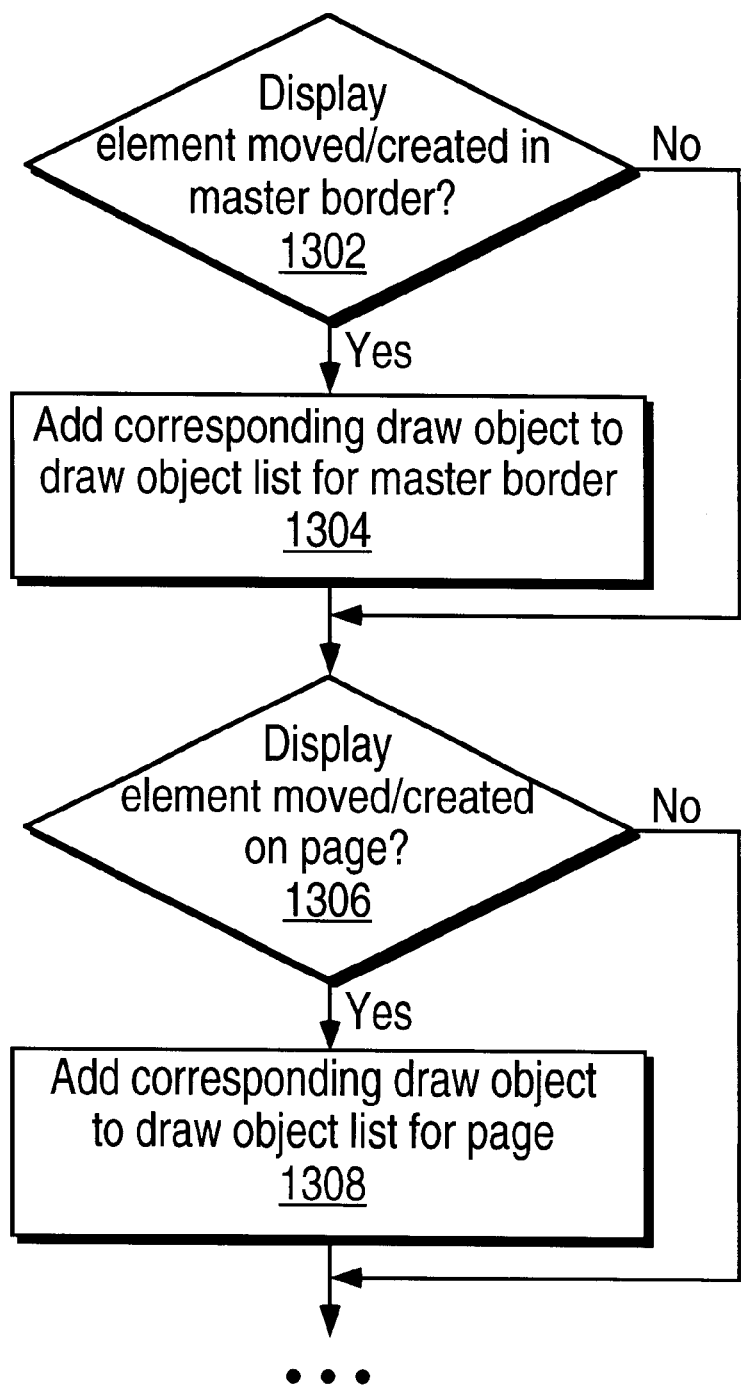
FIG. 13 is a flow chart showing steps to add a new element or move an existing element to a page or a master border.

FIG. 13 is a flow chart showing steps to add a new element or move an existing element to a page or a master border.

Figure 14:
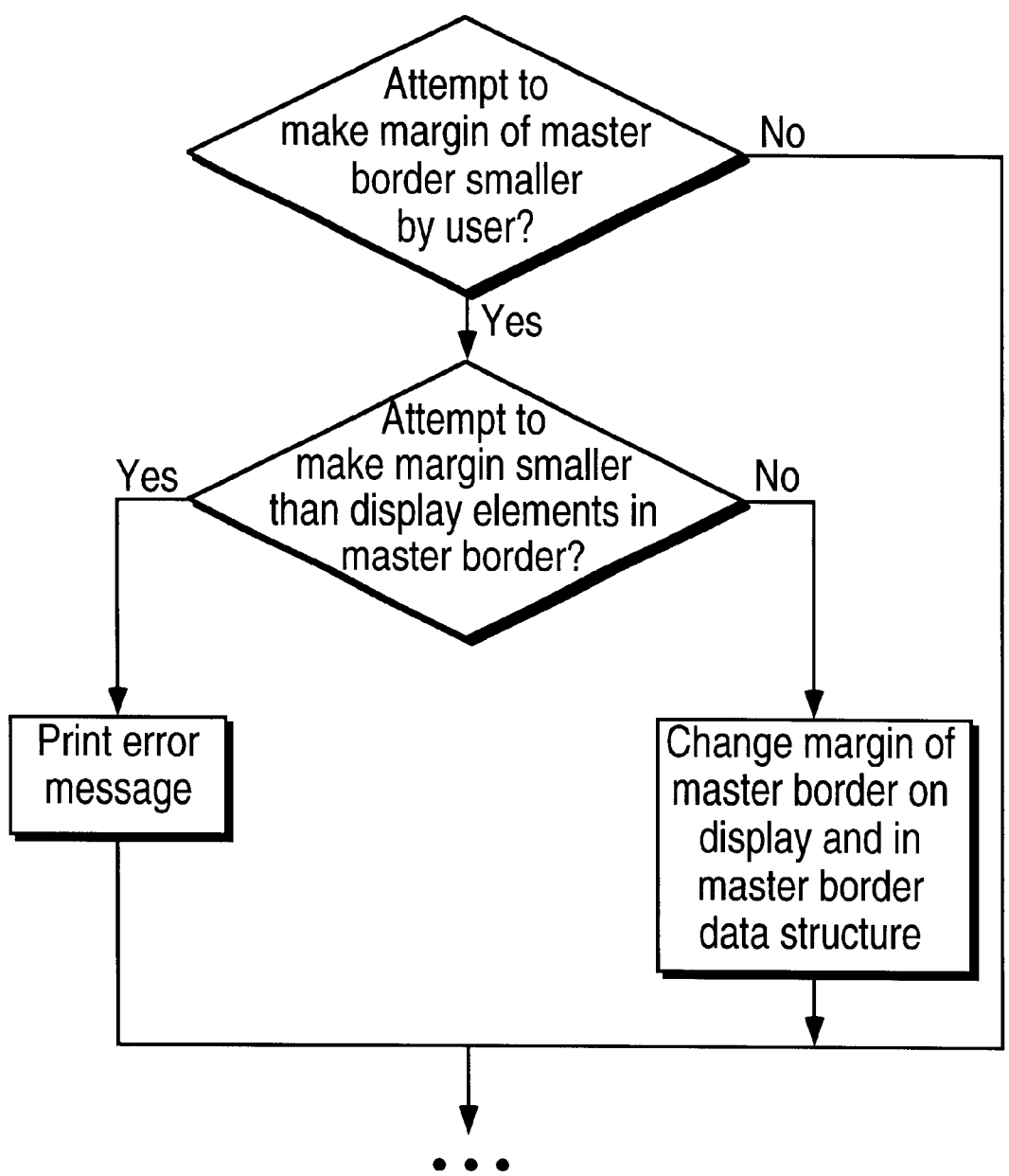
FIG. 14 is a flow chart showing steps to perform a size check determination for a master border.

FIG. 14 is a flow chart showing steps to perform a size check determination for a master border.

Figure 15:
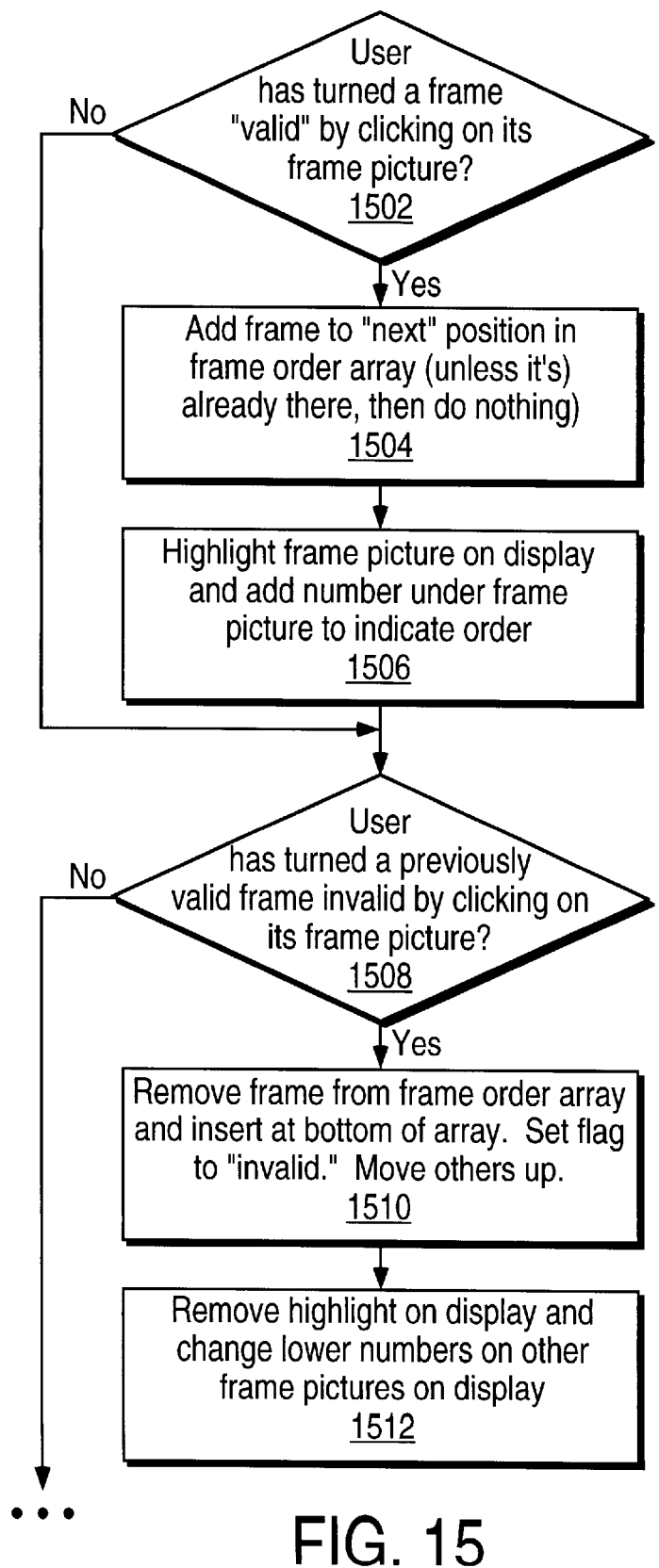
FIG. 15 is a flow chart showing steps performed when the user reorders frames in a master border.

FIG. 15 is a flow chart showing steps performed when the user reorders frames in a master border. Note that both the display (the numbers under the frame pictures and whether the frame pictures are highlighted) change and that the data structure associated with the frame order changes.

Publishing a Page

Once the user has created a layout for a Web page as described above, the user needs to be able to create HTML for the page in accordance with the draw objects of the page. In the described embodiment, this display actually allows the user to publish all pages in a Web site, generally as described in the U.S. Pat. No. 5,911,145 of Samir Arora et al., entitled "Hierarchical Structure Editor for Web Sites."

It will be understood that, generally, each page and each master border has a corresponding list of draw objects describing the elements of the page layout, and that processor 102 generates HTML in accordance with the lists of draw objects and with the master border. As described above, each list of draw objects automatically includes draw objects representing automatically generated banners and links (e.g., to the home, parent, sibling, and/or children pages of that page). These automatic links may be structural links. The draw objects of a page may also represent other, additional links added by the user that are not a part of the site hierarchy. Moreover, the user can use the page draw editor to remove some of the automatically generated draw objects links if he so desires. Unless the user explicitly removes them, however, these automatically generated links are present in each page layout. Thus, the generated internal representation for each page will contain links to the home, parents, siblings, and/or children pages for each page of the site view.

The generated page will also contain a master border in accordance with the data structure of FIG. 4.

HTML Generation for a Page

Figure 16:
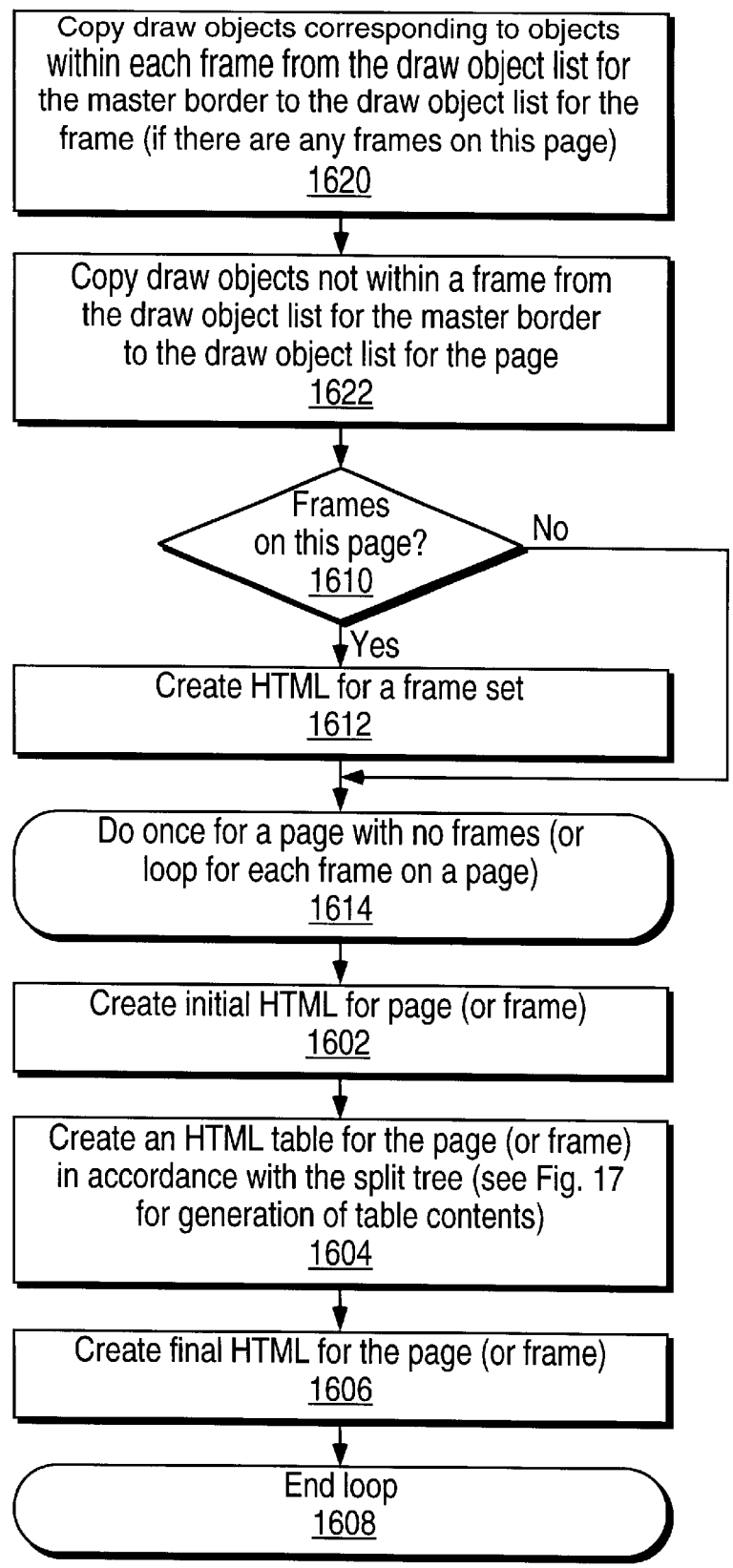
FIG. 16 a flow chart showing steps performed by the page editor software to publish a normal page.

FIG. 16 is a flow chart showing steps performed by the editor software 120 to publish a normal page.

If there are frames on the page, step 1620 copies draw objects corresponding to elements within each frame from the draw object list for the master border to the draw object list for the frame (see FIG. 4). In step 1622, draw objects corresponding to master border margins that are not frames are copied into the draw object list for the page, so that HTML will be generated for these objects when HTML is generated for the rest of the page.

In step 1610, if there are frames on the page, HTML for a frame set is created in step 1612, as is known to persons of ordinary skill in the art. Steps 1614 through 1608 are a loop that is performed once if there are no frames on the page (or that are performed once for each frame on the page).

Figure 18:
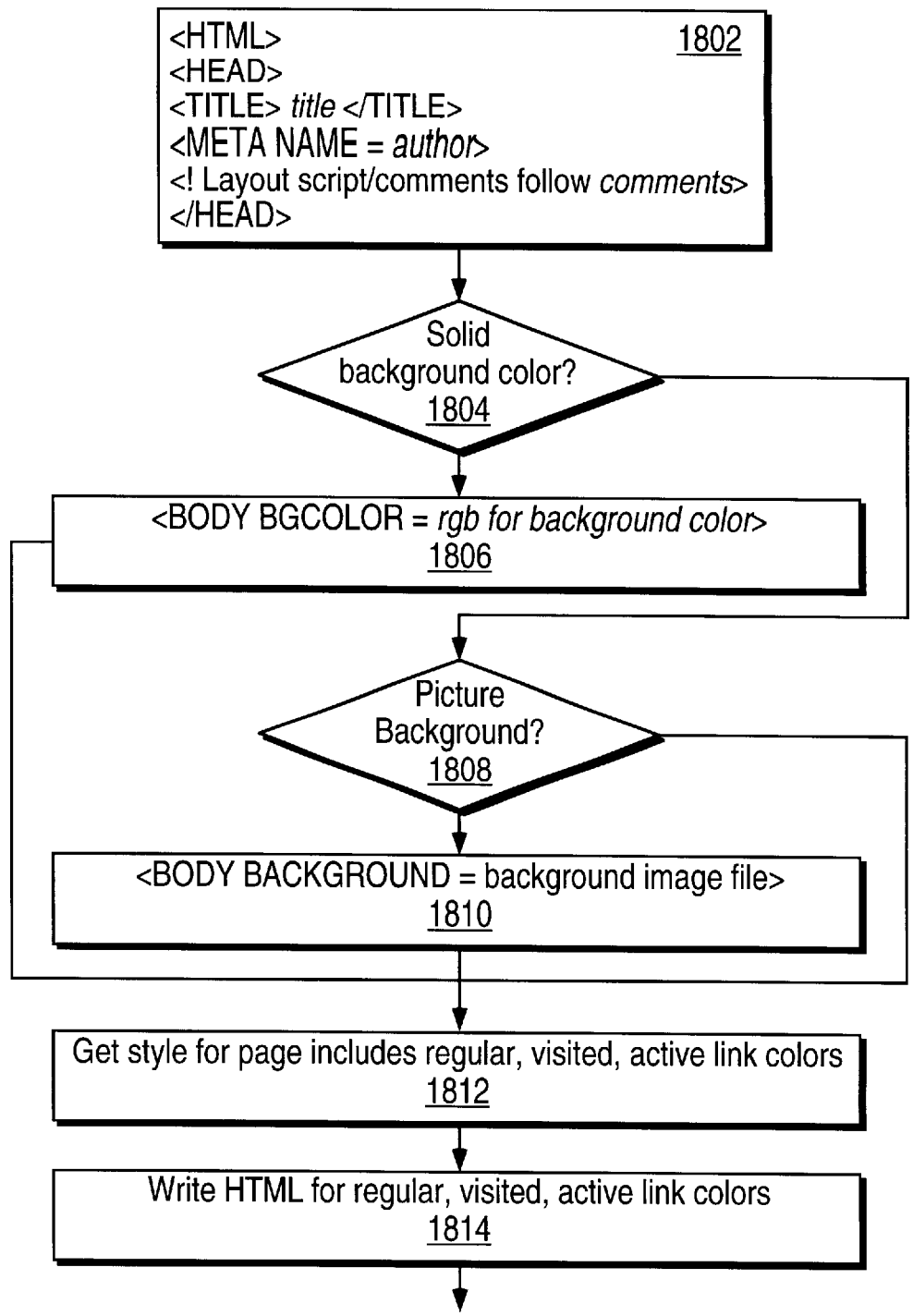
FIG. 18 is a flow chart showing steps performed by the page editor software to generate initial HTML for a page.
Figure 19:
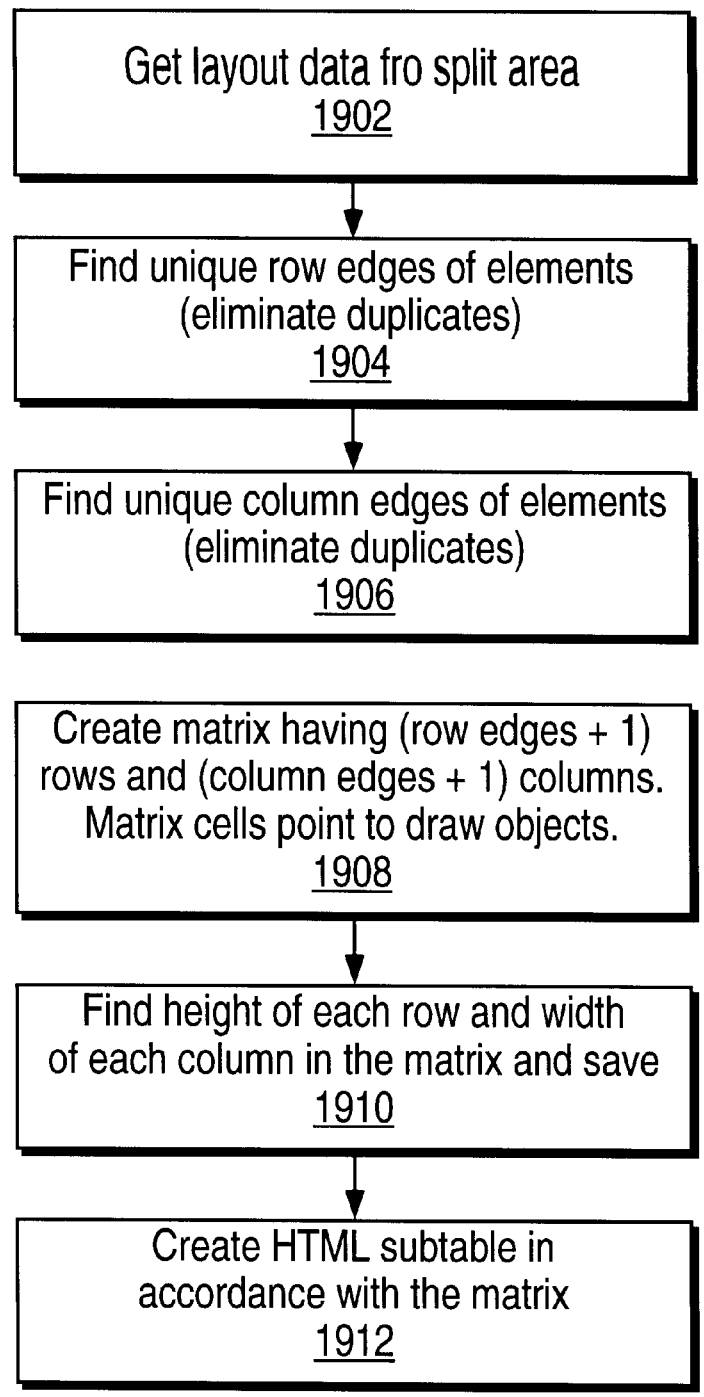
FIG. 19 is a flow chart showing further steps performed by the page editor software to generate an HTML table for display elements of a page or frame.
Figure 20:
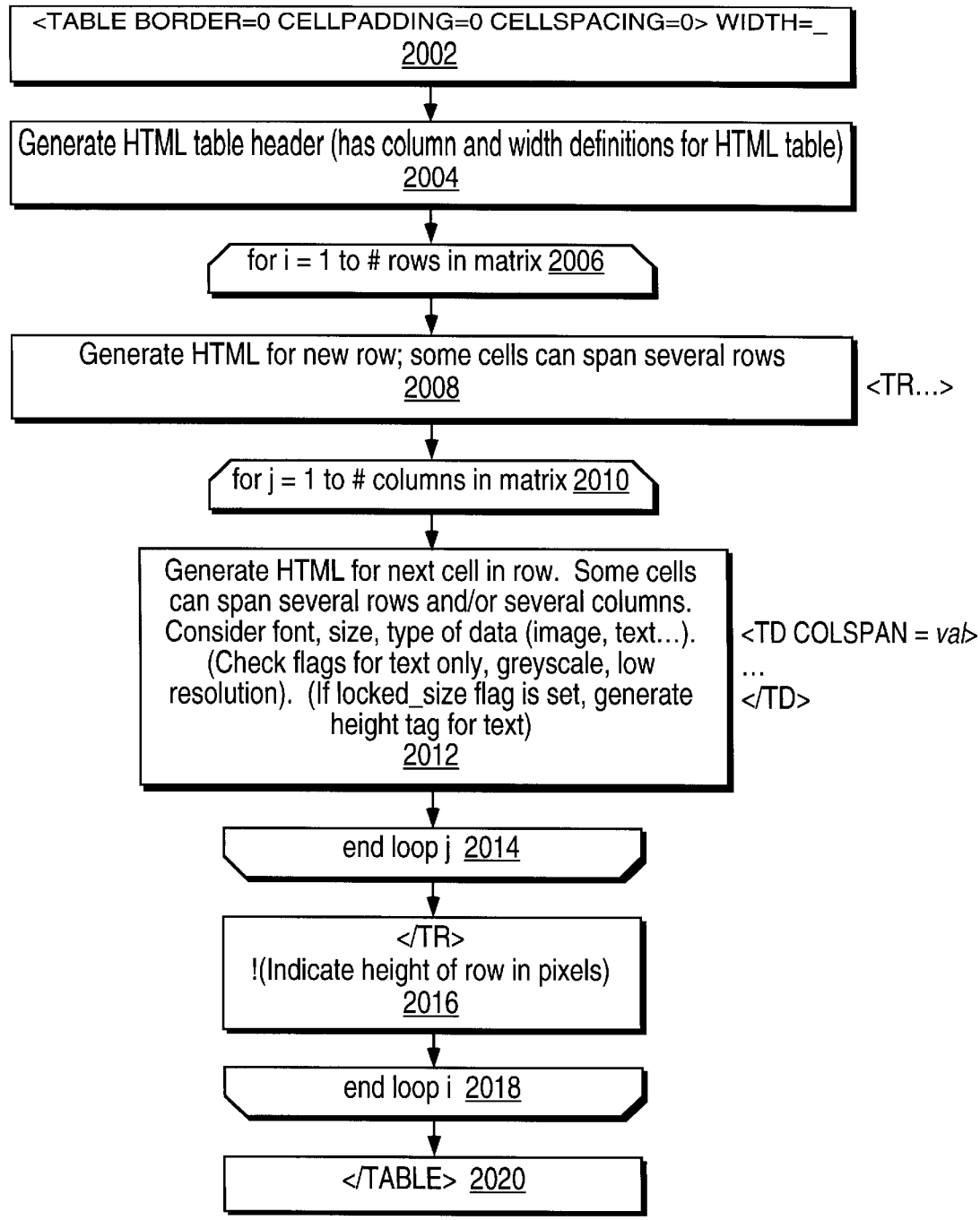
FIG. 20 is a flow chart showing steps performed by the page editor software to generate an HTML table.

Step 1602 creates initial HTML for the page as shown in FIG. 18. This step creates the beginning of an HTML page. Steps 1604–1608 create HTML tables for each of the header, body, and footer as shown in FIGS. 19 and 20. Step 1610 creates final HTML for the end of the page as shown in Step 2102 of FIG. 21. The preferred embodiment generates Netscape HTML version 3.X, although any appropriate version of HTML of any appropriate web specification language could be used.

Figure 17:
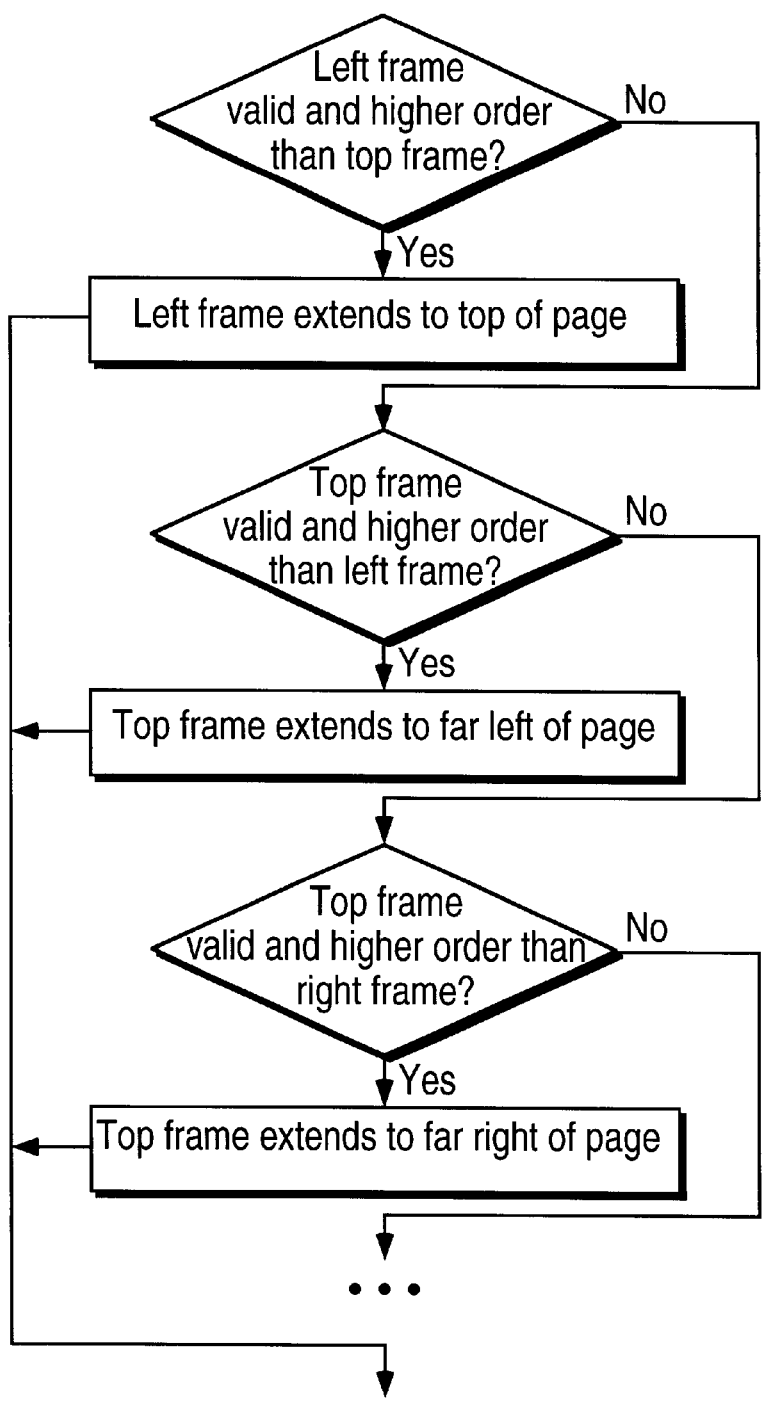
FIG. 17 is a flow chart showing steps performed to display frames based on a user-selected frame order.

FIG. 17 shows steps used to determine how margins of master borders that are frames should be displayed on the page layout (and subsequently how frames should be fit together when generating HTML.

Step 1814 of FIG. 18 shows that the HTML for a page includes a tag specifying the colors that a browser will use to display regular, visited, and active links. Other embodiments specify other HTML tags that specify other attributes common to the page.

FIG. 19 is a flow chart showing steps to build an HTML subtable. In the described embodiment, an HTML table is generated for the header, body, and footer of each page. Steps 1902–1908 generate a matrix in memory 104 as discussed below in connection with FIGS. 22–29. Step 1910 finds and saves the height of each row and width of each column in the matrix. Step 1912 creates the HTML table in accordance with the matrix as shown in FIG. 20.

FIG. 20 shows steps that create an HTML table. Step 2002 writes a table tag including a border of zero width and cellpadding and cellspacing of zero. Step 2004 generates a table header including column and width definitions for the HTML table. Steps 2006–2018 go through each row and column of the matrix to generate a plurality of cells in the HTML table. Some of the cells in the HTML table can be several columns wide and/or several rows high. Step 2020 generates an end of table tag.

Figure 22:
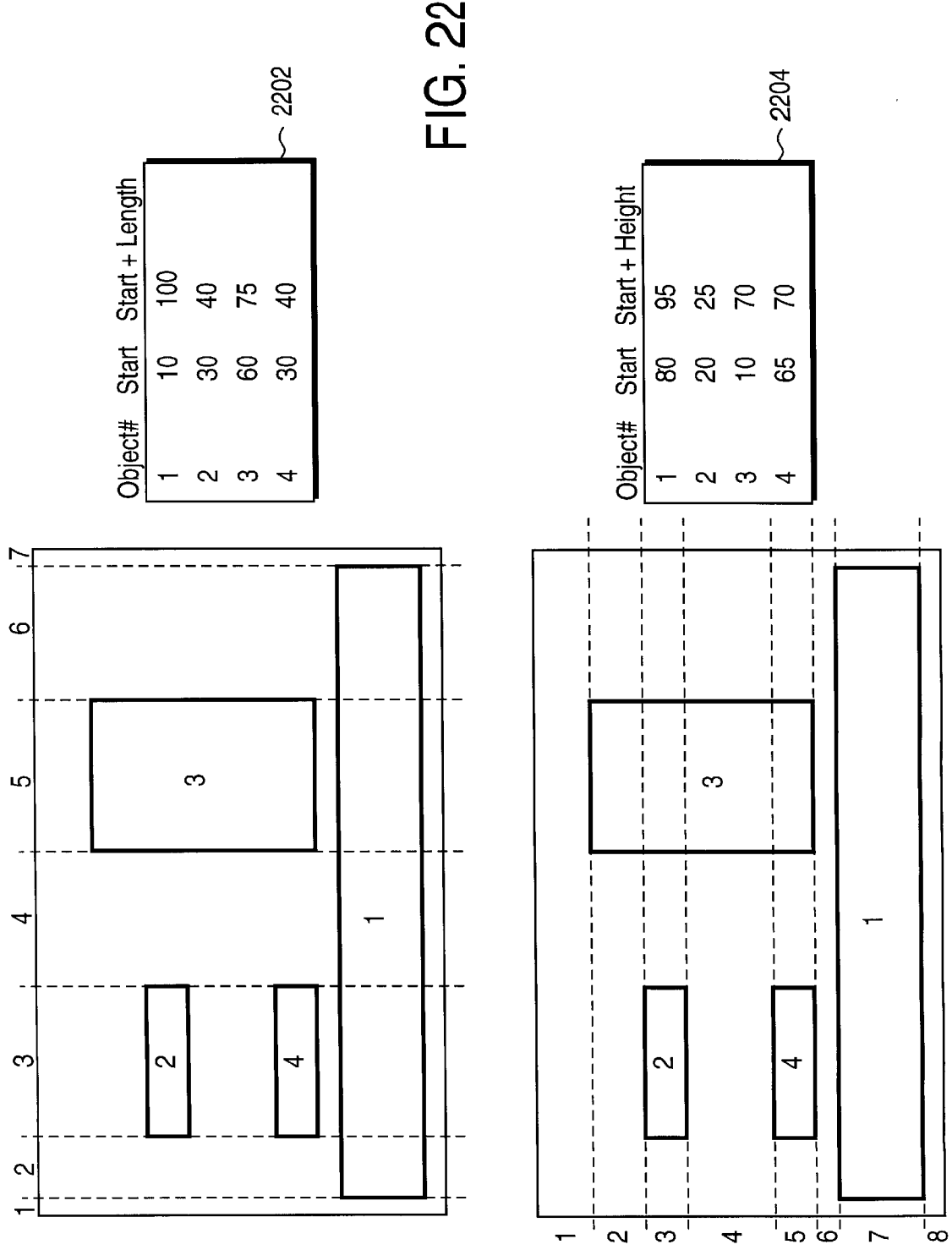
FIG. 22 is an example of first steps involved in determining an HTML subtable size.

FIG. 22 is an example of first steps involved in determining an HTML table size for a layout element of a header, body, or footer. In the example, the layout element has four display elements. Each display element corresponds to one draw object of the page. As discussed above, each draw object has an X position (a start row) and a length. Each draw object also has a Y position (a start column) and a height. For each object, a first column edge is the X start position and a second column edge is the X start position plus the length. In addition, for each object, a first row edge is the Y start position and a second row edge is the Y start position plus the height. Processor 102 finds the row edges and columns edges for a current page, yielding data 2202 and 2204.

FIG. 23 is an example of second steps involved in determining an HTML table size for a layout element. Once the column and row edges of the draw objects are determined, the edges are sorted, duplicate edges are removed from the sorted list, yielding unique row edges and unique column edges (steps 1904 and 1906 of FIG. 19). The unique rows edges and column edges are then counted. In the example, the objects have six column edges and seven row edges. Once the unique row edges and column edges are determined, the column widths and row heights for each column and row are determined.

Figure 24:
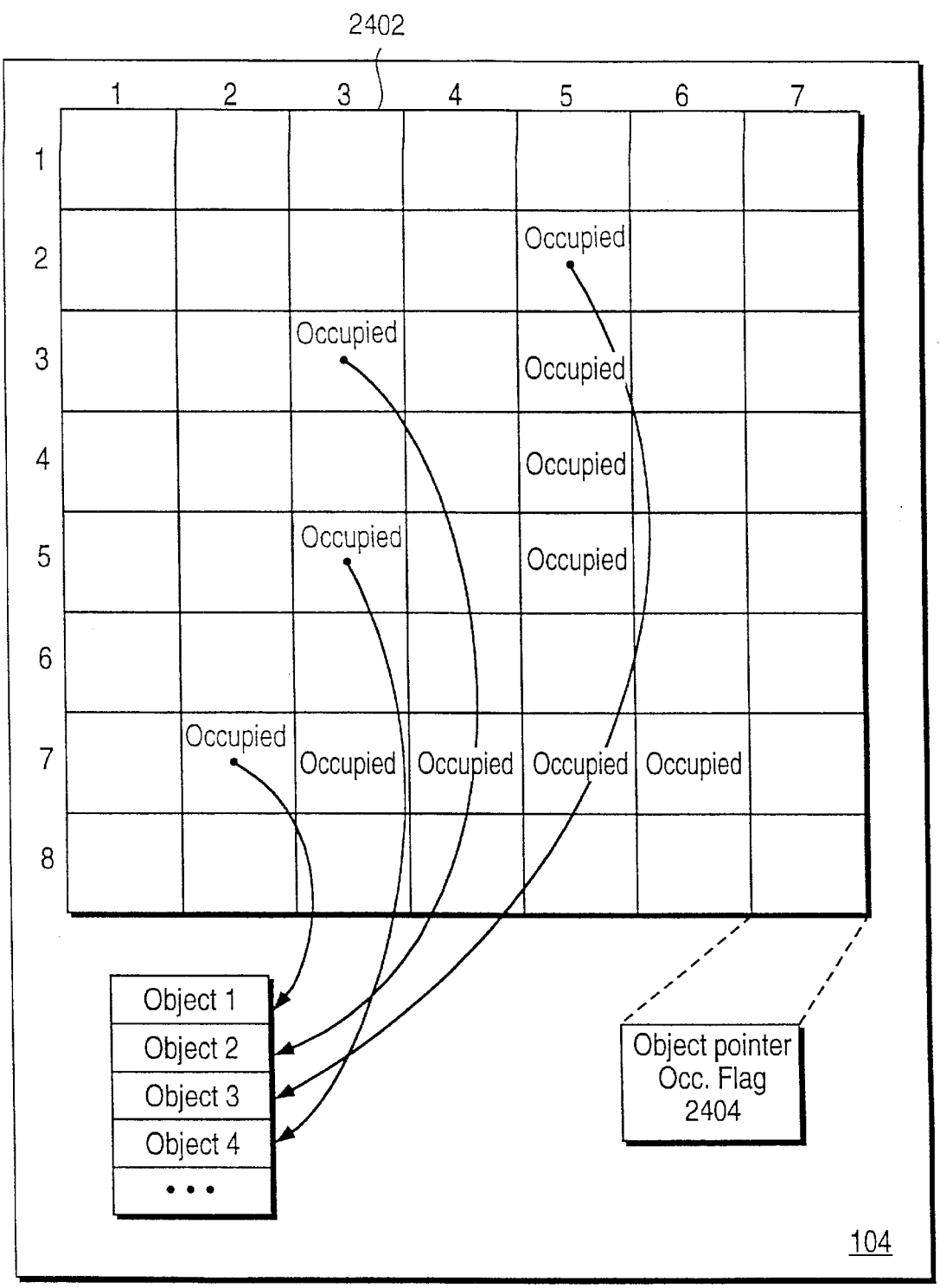
FIG. 24 is an example of a matrix generated by the steps of FIGS. 22 and 23.

FIG. 24 is an example of a matrix 2402 generated in accordance with the edges and draw objects. Matrix 2402 has a number of rows equal to the number of row edges plus one. The matrix has a number of columns equal to the number of column edges plus one. Thus, in the example, the matrix has seven columns and eight rows. Each element 2404 of the matrix has a pointer field and an occupied flag. The element of row 7, column 2 of the matrix points to object number 1 and is marked as occupied. The next four elements in row 2 are also marked as occupied. The element of row 3, column 3 points to object number 2 and is marked as occupied. The element of row 2, column 5 points to object number 3 and is marked as occupied. The next three elements in column 5 are also marked as occupied. The element of row 5, column 3 points to object number 4 and is marked as occupied.

FIG. 25 is a block diagram of how the matrix 2402 is used to generate an HTML table. The HTML table is used by a browser to display a portion of a page on display device 160 (such as a header, body, or a footer. (An alternate embodiment of the present invention creates a single table for each page of the site). Each element of the matrix is used to generate a cell in an HTML table (although some cells occupy more than one row or more than one column). For example, the matrix element in row 1, column 1 causes an empty table cell to be generated. Each row in the HTML table has a height in pixels that is equal to the height for that matrix row. Each cell in the HTML table has a width that is equal to the width of the matrix for that column.

As is known to persons of ordinary skill in the art, the cells in the table can be of varying sizes (i.e., can use the HTML tags "ROWSPAN" and "COLSPAN"). The matrix element in row 2, column 5 causes generates of a cell that spans four rows (ROWSPAN=4). The matrix element in row 7, column 2 causes generation of a cell that spans five column (COLSPAN=5).

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A computer-implemented method of specifying borders for a plurality of web pages, comprising:
defining a master border which specifies border properties for a web page, the master border having master border properties, the web page comprising a plurality of display elements; and
assigning, to a plurality of web pages each of which comprises a plurality of display elements, a master border identifier, the master border identifier associated with the master border, thereby providing that each of the plurality of web pages inherit the border properties corresponding to the master border.

2. The method of claim 1, further comprising generating HTML for the web page and the master border.

3. The method of claim 1, further comprising the step of re-assigning one of the web pages a different master border identifier which identifies a different master border, thereby assigning the web page different border properties corresponding to the different master border.

4. A computer-implemented method of specifying borders for a plurality of web pages, comprising:
defining a master border which specifies border properties for a web page;
assigning, to each of a plurality of web pages, a master border identifier which identifies the master border, thereby providing each of the plurality of web pages inherit the border properties corresponding to the master border;
allowing the user to select at least one margin of the master border to be implemented as a frame; and
allowing the user to choose an autoframe order for the selected margins of the master border.

5. The method of claim 4, further comprising generating HTML for the web page, where the selected margins have HTML frames generated for them.

6. A computer-based method, comprising:
providing a web site having multiple web pages, wherein each web page is assigned a master border identifier;
retrieving master border data corresponding to a particular master border identifier, the master border data identifying border properties;
using the master border data to present a master border in edit mode; and
enabling manipulation of the master border data to generate manipulated master border data corresponding to the master border identifier, thereby enabling modification of the border properties for each web page being assigned the particular master border identifier.

7. The method of claim 6, wherein each web page is originally assigned a default master border identifier corresponding to default master border data.

8. The method of claim 7, wherein the default master border data defines default widths for top, bottom, left and right margins for a web page.

9. The method of claim 6, wherein the master border data defines margins for the web page, and at least one margin is implemented as a frame.

10. The method of claim 6, wherein the master border data identifies objects to be presented within the master border.

11. The method of claim 6, wherein the step of enabling manipulation includes presenting a master border properties window.

12. The method of claim 11, wherein the master border properties window presents margin values defining margin widths of the master border.

13. The method of claim 12, wherein the margin values can be modified to manipulate the master border data.

14. The method of claim 9, further comprising the steps of allowing a user to choose an autoframe order for the margins of the master border, and displaying the margins in accordance with the autoframe order.

15. The method of claim 6, wherein enabling manipulation includes confirming that the manipulation does not violate predetermined error criteria.

16. A system, comprising:
first memory storing web page data for a web site having multiple web pages, and storing a master border identifier for each web page;
second memory storing master border data corresponding to each master border identifier, the master border data identifying border properties;
first editor module for using particular master border data corresponding to a particular master border identifier to present a master border in edit mode; and
second editor module for enabling manipulation of the master border data to generate manipulated master border data, and for modifying the master border data in the second memory, thereby enabling modification of the border properties for each web page being assigned the particular master border identifier.

17. The system of claim 16, wherein each web page is originally assigned a default master border identifier corresponding to default master border data in the second memory.

18. The system of claim 17, wherein the default master border data defines default widths for top, bottom, left and right margins for a web page.

19. The system of claim 16, wherein the master border data defines margins for the web page, and at least one margin is implemented as a frame.

20. The system of claim 16, wherein the master border data identifies objects to be presented within the master border.

21. The system of claim 16, wherein the second editor module includes means for presenting a master border properties window.

22. The system of claim 21, wherein the master border properties window includes areas presenting margin values defining margin widths of the master border.

23. The system of claim 22, wherein the second editor module enables modification of the margin values to manipulate the master border data.

24. The system of claim 19, wherein the second editor module allows a user to choose an autoframe order for the margins of the master border and wherein the first editor module displays the margins in accordance with the autoframe order.

25. The system of claim 19, wherein the second editor module informs the user if the manipulation violates predetermined error criteria.

26. A computer-readable storage medium storing program code for causing a computer to perform the steps of:

retrieving master border data identified by a master border identifier, the master border data identifying border properties for web pages on a web site;

using the master border data to present a master border in edit mode;

enabling manipulation of the master border data to generate manipulated master border data corresponding to the master border identifier, thereby enabling modification of the border properties for each web page being assigned the master border identifier.

27. A system, comprising:

first memory storing web page data for a web site having multiple web pages, and storing a master border identifier for each web page;

second memory storing master border data corresponding to each master border identifier, the master border data identifying border properties;

means for using particular master border data corresponding to a particular master border identifier to present a master border in edit mode; and means for enabling manipulation of the master border data to generate manipulated master border data, and for modifying the master border data in the second memory, thereby enabling modification of the border properties for each web page being assigned the particular master border identifier.

28. In a web page creation system, a computer-implemented method, comprising:

assigning automatically a default master border identifier to a web page;

presenting the web page using a default master border corresponding to the default master border identifier;

enabling manipulation of the default master border corresponding to the default master border identifier to generate a manipulated master border; and enabling assignment of a different master border identifier corresponding to the manipulated master border to a plurality of web pages, wherein the plurality of web pages comprise a plurality of display elements, and whereupon the web page generation system generates each of the plurality of web pages with a border, the border corresponding to the manipulated master border.

* * * * *